United States Patent
Nakamura

(10) Patent No.: US 8,541,075 B2
(45) Date of Patent: *Sep. 24, 2013

(54) GLASS-CONTAINING RESIN MOLDED PRODUCT

(76) Inventor: Kenji Nakamura, Osaka (JP)

( * ) Notice: Subject to any disclaimer, the term of this patent is extended or adjusted under 35 U.S.C. 154(b) by 84 days.

This patent is subject to a terminal disclaimer.

(21) Appl. No.: 12/993,212

(22) PCT Filed: Jul. 30, 2009

(86) PCT No.: PCT/JP2009/063613
§ 371 (c)(1),
(2), (4) Date: Dec. 21, 2011

(87) PCT Pub. No.: WO2011/013236
PCT Pub. Date: Feb. 3, 2011

(65) Prior Publication Data
US 2012/0088046 A1    Apr. 12, 2012

(51) Int. Cl.
*A47G 19/22*    (2006.01)
(52) U.S. Cl.
USPC ........................... 428/34.4; 428/34.5
(58) Field of Classification Search
USPC ................ 428/34.5, 34.4, 406; 523/123, 223
See application file for complete search history.

(56) References Cited

U.S. PATENT DOCUMENTS

| 8,007,907 | B2 * | 8/2011 | Nakamura | 428/403 |
| 8,344,044 | B2 * | 1/2013 | Nakamura | 523/122 |
| 2010/0292067 | A1 | 11/2010 | Nakamura | |
| 2012/0088046 | A1 * | 4/2012 | Nakamura | 428/34.5 |

FOREIGN PATENT DOCUMENTS

| JP | 10-166382 | | 6/1998 |
| JP | 2001-18271 | A | 1/2001 |
| JP | 2001-88198 | A | 4/2001 |
| JP | 2005-66823 | A | 3/2005 |
| JP | 2006-110905 | A | 4/2006 |
| JP | 2009-18467 | A | 1/2009 |
| WO | WO 2009/044884 | A1 | 4/2009 |

OTHER PUBLICATIONS

International Preliminary Report on Patentability issued by the International Bureau of WIPO on Feb. 7, 2012 in the corresponding PCT patent application No. PCT/JP2009/063613.
Koyo Arikata, "Anti-Failure Measures in Injection Molding Process", (2) Skin Layer and Fluidized Layer, Nikkan Kogyo Shinbun, Jul. 18, 2006, p. 10, line 1-6, under Fig. 1.9.
Sigma Press, "Plastic Materials for Molding Processing", Edited by Polymer Process Society, Feb. 25, 2005, p. 108, line 3-11 under Fig. 3.2 and p. 109, line 13-16 under Fig. 3.3.

* cited by examiner

*Primary Examiner* — N. Edwards
(74) *Attorney, Agent, or Firm* — Knobbe, Martens, Olson & Bear LLP

(57) ABSTRACT

Provide a glass-containing resin molded product having no skin layer formed on its surface and free from sink marks, warping and other forms of deformation, where such glass-containing resin molded product is characterized in that it is made of one type of resin selected from the group that includes polyethylene resin, polypropylene resin, polyethylene terephthalate resin and polyamide resin, that it contains solid, spherical glass beads with an average particle size of 10 to 40 μm and the glass blending ratio of these solid, spherical glass beads is 40 to 70 percent by weight, and that in these ranges no skin layer is formed on the surface of such glass-containing resin molded product when measured by the laser Raman method.

19 Claims, 9 Drawing Sheets

GLASS-CONTAINING RESIN MOLDED PRODUCT

This application is the U.S. National Phase under 35 U.S.C. §371 of International Application PCT/JP2009/063613, filed Jul. 30, 2009. The International Application will be published under PCT Article 21(2) in a language other than English.

TECHNICAL FIELD

The present invention relates to a glass-containing resin molded product having no skin layer formed on the surface of the resin molded product formed by injection molding dies, profile extrusion molding dies or blow molding dies and thereby free from sink marks, warping or other forms of deformation.

PRIOR ART

In the manufacture of an injection molded product having fine shape and form by means of molding resin pellets using an injection molding machine, molten resin injected into injection molding dies is quickly cooled by the wall surfaces of dies forming the cavity, and a layer of solidified resin (hereinafter referred to as "skin layer") is formed on the wall surfaces. Similarly when a profile extrusion molded product is manufactured using an extrusion molding machine, a skin layer is formed as molten resin is extruded from the extrusion machine into dies.

This skin layer increases the flow resistance when molten resin is injected, and consequently the produced molded product often undergoes sink marks, warping and other forms of deformation as the resin shrinks, making it difficult to ensure dimensional accuracy. To achieve desired dimensional accuracy of molded products, various injection molding and profile extrusion molding methods as well as injection molding and profile extrusion molding dies have been proposed, examples of which include the patent literature mentioned below.

Under the hollow injection molding method for forming polyacetal resin molded products, a hollow section is formed by injecting a compressed liquid into resin during or after injection of resin. Because the pressure of gas injected into the hollow section is held for a specified period of time until all resin in the cavity is cooled, molding dimensions can be adjusted easily by adjusting the pressure of this compressed gas being injected as well as the pressure holding time of the compressed liquid. A polyacetal resin molded product obtained by this hollow injection molding method has a skin layer of not more than 150 μm in maximum thickness in the surface layer on the exterior surface of the molded product, but no skin layer is present in the surface layer on the interior surface of the molded product (refer to Patent Literature 1).

Under the conventional injection molding method, there is often a large difference between the resin pressure on gate side Pgr and resin pressure on counter-gate side Por, especially when elastomer or other resin having high elasticity is used or a long molded product is formed, and the resulting non-uniformity of resin pressure generates weight variation or distortion in the molded product, leading to the aforementioned skin layer defect due to density difference that prevents a quality molded product from being achieved. An injection molding method has been proposed to address this problem, wherein a pressure holding step is used to add a holding pressure Pc to resin L injected and filled into a die cavity C, where a target holding pressure Ps in this pressure holding step is set beforehand and once the molding process moves to the pressure holding step, the holding pressure Pc is added based on the target holding pressure Ps, and at the same time the resin pressure on gate side Pg and resin pressure on counter-gate side Po are detected in the die cavity C so that when the resin pressure on counter-gate side Po starts dropping, pressure control is applied to align the resin pressure on gate side Pg with the resin pressure on counter-gate side Po (refer to Patent Literature 2).

Another injection molding method has been proposed to prevent lines, sink marks, warping and other defects on the exterior surface of the molded product by injecting and filling resin while dies are hot, wherein after clamping injection is started in the injection/filling step after confirming that the temperature in the die cavity is equal to or above the heat deformation temperature (HDT) of the thermoplastic resin to be filled, and the injection/filling step is ended after detecting and confirming that the injection screw has reached the set filling completion position and the die cavity temperature has reached the specified level, after which the pressure holding step is started and ended according to the set pressure holding time and/or set die cavity temperature (refer to Patent Literature 3).

Furthermore, injection molding dies have been proposed for the purpose of providing injection molding dies offering excellent transferability and durability and being capable of reducing residual strain and warping, wherein such injection molding dies comprise fixed and moving dies that together form a cavity and these fixed and moving dies have a nest and this nest forms at least one part of the aforementioned cavity, where the aforementioned nest is constituted by a metal plate, heat-insulating ceramic material and metal nest body, arranged in this order, from the cavity side to counter-cavity side, while the aforementioned metal plate and ceramic material, and the aforementioned ceramic material and nest body, are joined by diffusion bonding with an insert material inserted between the respective members (refer to Patent Literature 4).

The profile extrusion molding apparatus described in Patent Literature 5 prevents generation of residual stress and distortion/deformation in rain gutters, sashes, deck materials and other profile extrusion molded products. When resin is passed through an insertion hole provided at the introduction part of the cooling bath of the forming apparatus (generally referred to as "molding machine") for the purpose of forced cooling, residual stress generates in the profile extrusion molded product because all parts of the profile extrusion molded product are not cooled uniformly, and consequently this residual stress generates distortion later on. Since the aforementioned profile extrusion molding apparatus is designed to let refrigerant in the refrigerant channel bore flow into the insertion hole via the slit in the flow-rate adjustment pipe, turning this flow-rate adjustment pipe allows for adjustment of the flow rate of refrigerant flowing into the insertion hole via the slit in the flow-rate adjustment pipe. This way, a long molded product, especially areas subject to non-uniform cooling, can be cooled uniformly and therefore generation of residual stress, and consequently distortion/deformation, can be prevented (refer to Patent Literature 5). The hollow molding dies described in Patent Literature 6 aim to provide a gas injection pin capable of directly supplying and injecting gas through the tip of the gas injection pin designed for easy injection of gas, in order to solve the problem of the viscosity of molten resin increasing gradually in the die cavity from the areas contacting the die cavity and thereby causing a skin layer to form, which required a high gas pressure to break the thick skin layer contacting the dies, resulting in warping/deformation of the resin molded product, as well as the problem of injected gas flowing into so-called partings, or spaces between the dies and skin layer, thereby creating gas flow marks on the surface of the molded product that will become molding defects.

The following known prior art literature refers to the mechanism of how the aforementioned skin layer is formed.

One theory is that when molten thermoplastic resin at a temperature of well over 200° C. is injected into the cavity (die temperature 40 to 70° C.), molten resin creates a fountain flow from the center of the tip of flow, and the part contacting the wall surface of the cavity cools immediately and solidifies to form a skin layer (refer to Non-patent Literature 1). Another theory is that molten resin flowing inside the cavity on the inner side of the skin layer forms a shear layer on the inner side of the skin layer due to the shear force acting between the skin layer and molten resin. To be specific, in the case of a crystalline polymer a trans-crystal layer of fine crystalline structure is formed on the inner side of the skin layer due to an inductive shear flow, and the aforementioned shear layer is formed on the inner side of this trans-crystal layer, meaning that three layers of skin layer, trans-crystal layer and shear layer are formed (refer to Non-patent Literature 2).

Patent Literature 1: Japanese Patent Laid-open No. Hei 10-166382
Patent Literature 2: Japanese Patent Laid-open No. 2001-18271
Patent Literature 3: Japanese Patent Laid-open No. 2006-110905
Patent Literature 4: Japanese Patent Laid-open No. 2009-18467
Patent Literature 5: Japanese Patent Laid-open No. 2001-88198
Patent Literature 6: Japanese Patent Laid-open No. 2005-66823
Non-patent Literature 1: "Shashutsu Seikei Kako no Furyo Taisaku (Countermeasures to Injection Molding Defects)," Nikkan Kogyo Shimbun, pp. 10-11, issued on Jul. 18, 2008 (Initial Edition, 6th Print)
Non-patent Literature 2: "Seikei Kako ni Okeru Plastic Zairyo—Plastic Seikei Kako III (Plastic Molding Materials—Plastic Molding III)", Shigma Shuppan, pp. 107-109, issued on Feb. 25, 2005 (Initial Edition, 2nd Print)

OVERVIEW OF THE INVENTION

Problems to Be Solved By the Invention

The polyacetal resin molded product described in Patent Literature 1 above is limited to the hollow injection molding method and the maximum thickness of skin layer must be reduced to no more than 150 μm by adjusting the pressure of compressed gas injected into the cavity as well as the pressure holding time of compressed liquid. Setting the aforementioned adjustment conditions to achieve a thickness at or below this target value is difficult and even if the various conditions could be set, controlling the necessary parameters according to these conditions is difficult.

The injection molding method described in Patent Literature 2 above cannot achieve the desired dimensional accuracy of molded product unless the transition of steps is time-managed and holding pressure and resin pressure are controlled strictly, but implementing such time management and pressure control is difficult.

The injection molding method described in Patent Literature 3 above cannot achieve the desired dimensional accuracy of molded product unless temperature detection, management of each step and holding pressure/temperature management are performed strictly, but implementing such temperature detection, management of each step and holding pressure/temperature management is difficult.

The injection molding dies described in Patent Literature 4 above form a cavity with fixed and moving dies, while the nest is constituted by a ceramic material and metal nest body arranged in this order and the metal nest body is diffusion bonded to each member via an insert material inserted in between. Since these injection molding dies require the nest-type fixed and molding dies to be bonded via diffusion bonding, the die structure is complex and requires high precision, but fabricating such complex high-precision dies requires a lot of money and other burdens such as fabrication man-hours.

A conventional profile extrusion molding apparatus comprises an extrusion machine, dies, a molding machine having a cooling layer, a take-up machine and a cutting machine. The extrusion molding machine described in Patent Literature 5 above allows for uniform cooling of areas subject to non-uniform cooling by turning the flow-rate adjustment pipe of the molding machine (forming apparatus), but fabricating such apparatus by modifying a conventional profile extrusion molding apparatus requires a lot of money and other burdens such as fabrication man-hours. The hollow molding dies described in Patent Literature 6 above are characterized by a new gas injection pin installed on the hollow molding dies, instead of the traditional gas injection pin, to prevent formation of skin layer on the surface of resin molded product, where fabrication of such new gas injection pin requires a lot of money and other burdens such as fabrication man-hours.

As explained above, the inventions described in Patent Literatures 1 to 6 above are aimed at minimizing sink marks, warping and other forms of deformation through the use of the aforementioned injection molding apparatus, injection molding dies, extrusion molding apparatus or hollow molding dies, based on the assumption that formation of a skin layer results in generation of sink marks, warping and other forms of deformation in the resin molded product, and they require specific controls for each molded product to be manufactured, fabrication of complex dies, etc., which in turn require a lot of money and other burdens such as fabrication man-hours.

For these reasons, it is the object of the present invention to provide a glass-containing resin molded product having no skin layer formed on the surface of the resin molded product formed by a conventional method with generally used dies and thereby free from sink marks, warping or other forms of deformation.

Means for Solving the Problems

The inventor of the present invention, after repeated examinations in earnest to solve the aforementioned problems, found that while a skin layer is formed on the surface of a glass-containing resin molded product containing solid, spherical glass beads by less than 40 percent by weight, no skin layer is formed on the surface of the glass-containing resin molded product if the aforementioned blending ratio is adjusted to a range of 40 to 70 percent by weight, and eventually completed the present invention.

In other words, the present invention is described as follows:

The glass-containing resin molded product pertaining to Embodiment 1 of the present invention is a glass-containing resin molded product formed by molding in contact with dies a glass-containing resin produced by melting and kneading glass-containing molding pellets each constituted by a thermoplastic resin containing solid, spherical glass beads; wherein such glass-containing resin molded product is characterized in that the thermoplastic resin is one type of resin selected from the group consisting of polyethylene resin, polypropylene resin, polyethylene terephthalate resin and polyamide resin, the solid, spherical glass beads have an average particle size of 10 to 40 μm and the glass blending ratio of the solid, spherical glass beads is in a range of 40 to 70 percent by weight, and in these ranges no skin layer is formed on the surface of such glass-containing resin molded product as measured by laser Raman spectroscopy.

Similarly, the glass-containing resin molded product pertaining to Embodiment 2 of the present invention is characterized in that sink marks, warping and flow marks are not generated on the surface of such glass-containing resin molded product.

The glass-containing resin molded product pertaining to Embodiment 3 of the present invention is characterized in that the spherical beads are made of E glass or silica glass.

The glass-containing resin molded product pertaining to Embodiment 4 of the present invention is characterized in that the dies are injection molding dies, profile extrusion molding dies or blow molding dies.

The glass-containing resin molded product pertaining to Embodiment 5 of the present invention is characterized in that such glass-containing resin molded product is used for cosmetic containers, cosmetic implements, chemical containers, food containers, tableware, trays, tiles, bathtubs, kitchen/bath products, toiletry, automobile parts, electronics parts or construction materials.

The glass-containing resin molded product pertaining to Embodiment 6 of the present invention is a glass-containing resin molded product formed by molding in contact with dies a glass-containing resin produced by melting and kneading glass-containing molding pellets each constituted by a thermoplastic resin containing solid, spherical glass beads, wherein such glass-containing resin molded product is characterized in that the thermoplastic resin is one type of resin selected from the group consisting of polyethylene resin, polypropylene resin, polyethylene terephthalate resin and polyamide resin, the solid, spherical glass beads have an average particle size of 10 to 40 μm and the glass blending ratio of the solid, spherical glass beads is in a range of 40 to 70 percent by weight, and in these ranges the heat conductivity improvement index of such glass-containing resin molded product is 1.52 or more and the spherical glass beads are present on the surface of such glass-containing resin molded product.

The glass-containing resin molded product pertaining to Embodiment 7 of the present invention is characterized in that sink marks, warping and flow marks are not generated on the surface of such glass-containing resin molded product.

The glass-containing resin molded product pertaining to Embodiment 8 of the present invention is characterized in that the front side of such glass-containing resin molded product comprises a number of distributed convex shapes.

The glass-containing resin molded product pertaining to Embodiment 9 of the present invention is characterized in that the spherical glass beads are made of E glass or silica glass.

The glass-containing resin molded product pertaining to Embodiment 10 of the present invention is characterized in that the dies are injection molding dies or profile extrusion molding dies.

The glass-containing resin molded product pertaining to Embodiment 11 of the present invention is characterized in that as the glass blending ratio increases, the heat conductivity improvement index of such glass-containing resin molded product improves gradually according to Formula (1) below:

$$y = 0.0131x + 0.994 \tag{1}$$

(x: glass blending ratio; y: heat conductivity improvement index).

The glass-containing resin molded product pertaining to Embodiment 12 of the present invention is characterized in that such glass-containing resin molded product is used for cosmetic containers, cosmetic implements, chemical containers, food containers, tableware, trays, tiles, bathtubs, kitchen/bath products, toiletry, automobile parts, electronics parts or construction materials.

The glass-containing resin molded product pertaining to Embodiment 13 of the present invention is a glass-containing resin molded product formed by molding in contact with dies a glass-containing resin produced by melting and kneading glass-containing molding pellets each constituted by a thermoplastic resin containing solid, spherical glass beads, wherein such glass-containing resin molded product is characterized in that the thermoplastic resin is one type of resin selected from the group consisting of polyethylene resin, polypropylene resin, polyethylene terephthalate resin and polyamide resin, the solid, spherical glass beads have an average particle size of 10 to 40 μm and are made of E glass or silica, and the spherical glass beads are present on the surface of such glass-containing resin molded product.

The glass-containing resin molded product pertaining to Embodiment 14 of the present invention is characterized in that sink marks, warping and flow marks are not generated on the surface of such glass-containing resin molded product.

The glass-containing resin molded product pertaining to Embodiment 15 of the present invention is characterized in that the front side of such glass-containing resin molded product comprises a number of distributed convex shapes.

The glass-containing resin molded product pertaining to Embodiment 16 of the present invention is characterized in that the dies are injection molding dies or profile extrusion molding dies.

The glass-containing resin molded product pertaining to Embodiment 17 of the present invention is characterized in that such glass-containing resin molded product is used for cosmetic containers, cosmetic implements, chemical containers, food containers, tableware, trays, tiles, bathtubs, kitchen/bath products, toiletry, automobile parts, electronics parts or construction materials.

Effects of the Invention

In the field of resin molding technology, it has been a matter of fact that a skin layer is formed on the surface of resin molded products. In this sense, the glass-containing resin molded product proposed by the present invention is an innovative creation that demolishes this technical commonsense in that, by the benefit of non-formation of skin layer, it can be utilized in various different fields such as containers, automobile parts, electronic parts and construction materials, to name a few.

To be specific, a molded product can be produced without allowing a skin layer to form as molten resin is molded in contact with dies, so long as the blending ratio of solid, spherical glass beads contained in the molded product is in a range of 40 to 70 percent by weight, and the molded product thus produced is free from sink marks, warping, flow marks or any other form of deformation on its surface, and in conclusion the present invention allows for production of a molded product offering good quality in terms of dimensional accuracy, etc., by using traditional dies and molding methods, which in turn eliminates the needs to fabricate complex, high-precision dies for each molded product or strictly control the flow rate, temperature and other conditions of molten resin, and these benefits eventually lead to significant reduction in production cost and improvement in production efficiency.

Furthermore, the aforementioned glass-containing resin molded product can reduce carbon dioxide emissions by up to 70 percent when the molded products, made from glass-containing molding pellets, are incinerated, and therefore the present technology contributes significantly to the solving of global warming which is an issue the entire world is facing. Since it can reduce use of thermoplastic resins, i.e., petroleum, by as much as 70 percent, the present technology also contributes significantly to the solving of depletion of limited petroleum resources.

In addition, used glass-containing resin molded products can be crushed using a crusher and crushed fragments can be used in place of pellets to form glass-containing resin molded products again, which indicates that the present invention also contributes significantly to the formation of a recycling society which is an issue the entire world is facing.

BEST MODE FOR CARRYING OUT THE INVENTION

Figure 1:
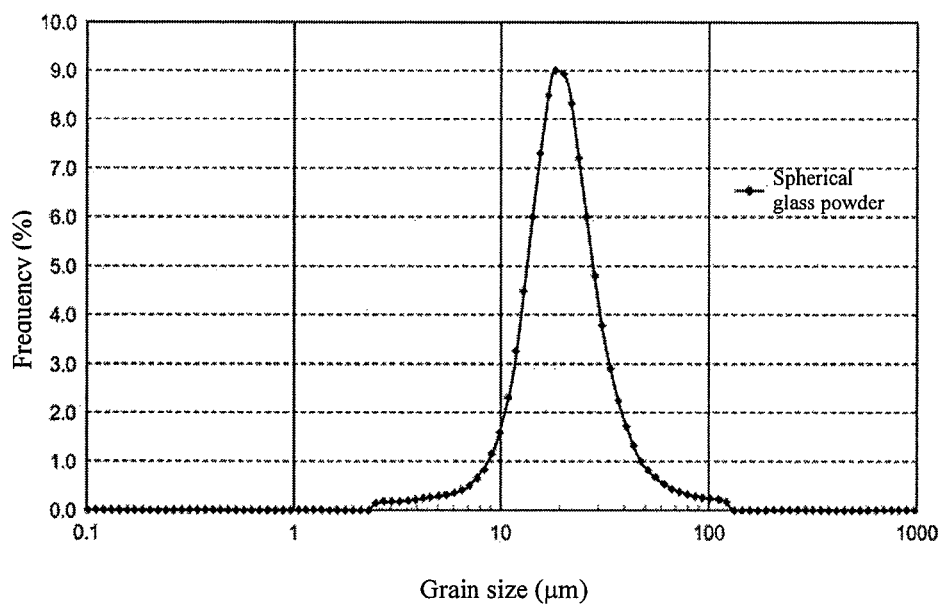
[FIG. 1] A distribution diagram showing a distribution of average particle sizes of spherical glass beads.

Prior to filing the present application for patent, the inventor of the present invention had studied in earnest to form pellets (glass-containing molding pellets) by kneading glass powder of at least 40 percent by weight into a general-purpose thermoplastic resin and then extruding the mixture from an extrusion machine, and consequently completed glass-containing molding pellets that would allow up to 70 percent by weight of solid, spherical glass beads to be contained in a general-purpose thermoplastic resin and thereby filed the application for patent under PCT/JP2008/68093 (Japanese Patent Application No. 2009-50451) (Title of the Invention: "Glass-containing Molding Pellets and Process for Manufacturing the Same," Priority Claim Date: Oct. 4, 2007 (International Patent Application Publication No. WO2009/044884). The aforementioned solid, spherical beads can be contained in a general-purpose thermoplastic resin by only up to 70 percent by weight because, simply put, kneading and extruding a general-purpose thermoplastic resin containing spherical glass beads by 70 percent or more by weight would cause the flowability of the molten resin containing spherical glass beads to drop suddenly and thereby make its extrusion difficult, as described in details under International Patent Application Publication No. WO2009/044884 cited above.

Forming methods of glass-containing molding pellets made of nine types of resins, along with manufacturing methods of spherical glass beads, are described in detail under International Patent Application Publication No. WO2009/044884 cited above, and while forming methods of glass-containing molding pellets was already known to the public prior to the filing of the present application for patent, a method to form molding pellets by blending spherical glass beads into general-purpose thermoplastic resins that are used in large quantities for injection molded products, etc., such as polyethylene resin (hereinafter referred to as "PE"), polypropylene resin (hereinafter referred to as "PP"), polyethylene terephthalate resin (hereinafter referred to as "PET") and polyamide resin (hereinafter referred to as "Ny") is explained below.

(Thermoplastic Resins)

Various types of resins can be used to form thermoplastic resins by the injection molding method or extrusion molding method, where PE, PP, PET and Ny are among the general-purpose thermoplastic resins that are used in large quantities for injection molded products and profile extrusion molded products, and the present invention uses one type of resin selected from the group that includes the aforementioned resins that are well-known crystalline polymers.

(Spherical Glass Beads)

Examples of glass constituting the spherical glass beads under the present invention include, among others, alkali glass, soluble glass, non-alkali glass and silica glass whose skeletal component is made of one or two or more of $SiO_2$, $B_2O_3$ and $P_2O_3$. Spherical shape can be achieved by crushing and spheroidizing glass fibers, thereby achieving a sharp distribution of average particle sizes. Since a high alkali content in the aforementioned spherical glass beads tends to make the thermoplastic resin brittle, E glass or silica glass containing no alkali is desired.

The aforementioned spherical glass beads are made from a material whose glass fibers are 20 μm in diameter. Since glass fibers have a specific diameter, crushed fragments of 20 μm in diameter and 10 to 30 μm in length can be obtained by crushing glass fibers in a manner not causing their length to vary from the aforementioned diameter of 20 μm. These crushed fragments are sprayed over the 2500 to 3000° C. flames of an oxygen burner provided inside a furnace to spheroidize the fragments, after which water containing 0.1 percent by weight of γ-glycidyl oxy propyl methyl diethoxy silane is sprayed from a water spray provided at the bottom of the furnace, and then silanization was performed while the aforementioned water was still present in an atomized state, and glass powder was trapped using a bag filter. The trapped glass powder had a spherical shape with an average particle size of 10 to 40 μm. By using the aforementioned material whose glass fiber was 20 μm in diameter, spherical glass powder with an average particle size of 10 to 40 μm was obtained. The obtained spherical glass beads were solid. This method involving silanization using silane in atomized state, as mentioned above, is hereinafter referred to as the "atomization method."

When the aforementioned spheroidized glass powder is silanized using the aforementioned atomization method, the aforementioned glass beads are obtained. In other words, these spherical glass beads are characterized in that their surface is covered entirely by a silane compound.

Examples of this silane compound include those expressed by the formula below:

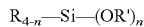

(In the formula, R represents an organic group, R' represents a methyl group, ethyl group or propyl group, and n is an integer of 1, 2 or 3.)

Examples of such silane compound include silane coupling agents having epoxy groups such as vinyl triethoxy silane, vinyl trimethoxy silane, γ-methacryloyl oxy propyl trimethoxy silane, β-(3,4-epoxy cyclohexyl)ethyl trimethoxy silane, γ-glycidyl oxy propyl trimethoxy silane and γ-glycidyl oxy propyl methyl diethoxy silane, silane coupling agents having mercapto groups such as γ-mercaptopropyl trimethoxy silane, and silane coupling agents having amino groups such as γ-amino propyl trimethoxy silane, N-β-(amino ethyl)-γ-amino propyl trimethoxy silane and N-β-(N-vinyl benzyl amino ethyl)-γ-amino propyl trimethoxy silane.

Conventional glass powder comes in various shapes such as polygon and rectangle, and their average particle size is distributed widely in a range of 10 to 100 μm. On the other hand, the glass powder conforming to the present invention has a spherical shape and whose average particle size is distributed over a very narrow range of 10 to 40 μm.

FIG. 1 is a graph showing the frequency of distribution of average particle sizes of spherical glass beads obtained by the manufacturing method of spherical glass beads mentioned above. The horizontal axis of this graph represents the particle size (μm) of the aforementioned spherical glass bead, while the vertical axis represents the frequency of distribution (%). The aforementioned spherical E glass powder has a distribution peak at a particle size of 25 μm, and draws a normal distribution spanning 10 to 40 μm on both sides of this 25-μm point, indicating that the particle sizes in this range occur frequently.

Figure 2:
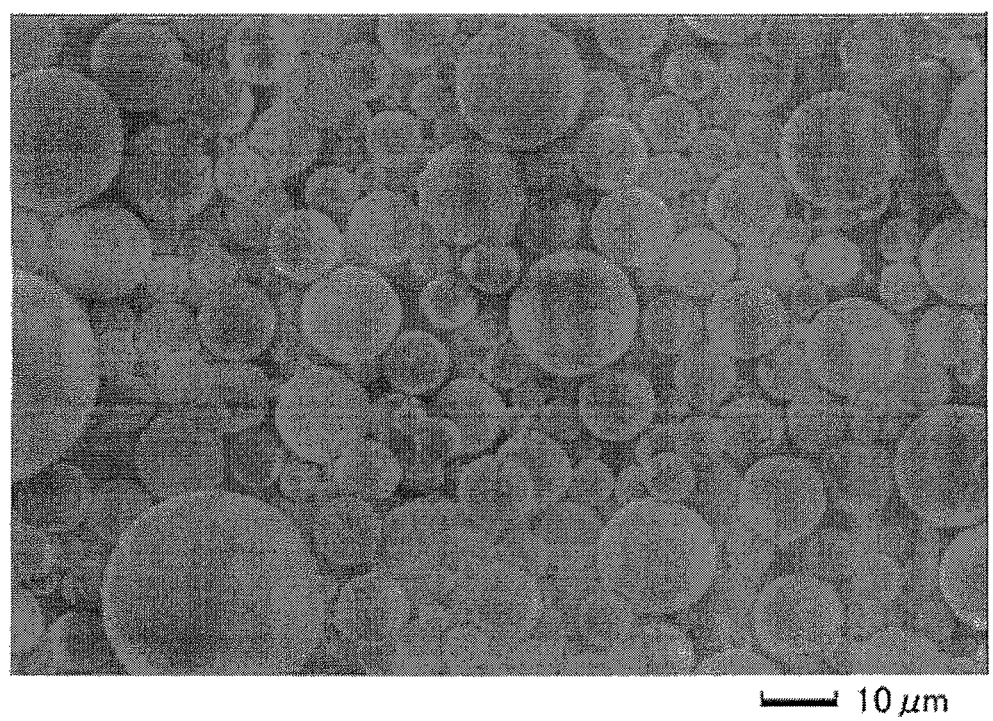
[FIG. 2] A ×1000 electron micrograph of a spherical glass bead.

FIG. 2 is a ×1000 electron micrograph of the aforementioned spherical glass beads. This micrograph shows that each spherical glass bead has a spherical shape and is solid, and there are glass beads of various particle sizes from large to small.

Based on the graph showing the frequency of distribution of average particle sizes of spherical E glass powder in FIG. 1 and this micrograph in FIG. 2, it is indicated that the spherical glass beads in the thermoplastic resin have a circular shape and have various particle sizes from large to small, but that their average particle size is in a range of 10 to 40 μm.

It should be noted that when glass powder is introduced into and kneaded with molten thermoplastic resin, the percentage of fiber particles will increase if the particle size of glass powder is 10 μm or less, in which case the glass powder will take heat from the resin due to a larger specific surface area and consequently the resin temperature will drop suddenly, thereby causing the melt viscosity to rise and resin temperature to also rise significantly during kneading due to shear heating, and as a result adjusting the blending ratio of the two materials will become difficult. In addition, while blending glass powder into thermoplastic resin generally improves the dimensional stability, mechanical strength (impact strength, bending strength, etc.), warping, permeation barrier property and other characteristics of the resulting molded product, use of a glass powder material having a particle size of 10 μm or less is not desirable because these characteristics, especially bending strength, will drop.

When the aforementioned particle size becomes 40 μm or more, the percentage of giant particles increases and, although the melt viscosity will not rise much during kneading, the cutting blade will wear intensely when the glass-containing composition is cut to pellets of a specific size, and consequently it will become difficult to continuously produce a large amount of the aforementioned glass-containing composition and production problems will occur. A particle size of 40 μm or more is not desirable because the aforementioned characteristics, especially impact strength, will drop. This gives a desired range of average particle sizes of 10 to 40 μm.

By blending and kneading up to 70 percent by weight of spherical glass beads into the aforementioned thermoplastic resin in molten state, and then extruding the mixture into a bar of 3 mm in diameter from the nozzle die provided at the outlet of the extrusion machine, followed by water cooling and cutting of the bar to a length of approx. 4 mm, glass-containing molding pellets constituted by spherical glass beads independently dispersed in the aforementioned thermoplastic resin are obtained. It should be noted, however, that the diameter and length are not at all limited to the foregoing.

Figure 3:
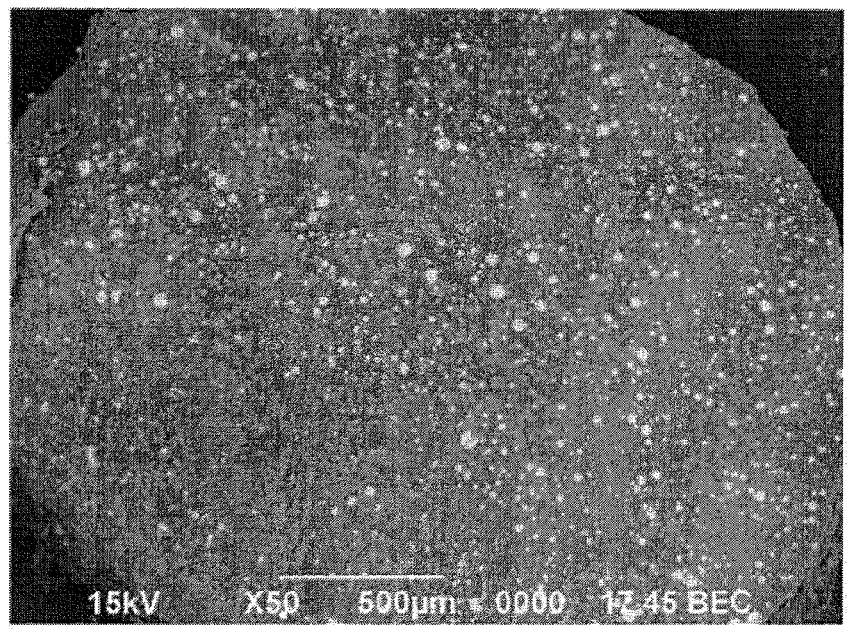
[FIG. 3] An electron micrograph showing a ×50 enlarged view of a cut section, cut vertically from side, of a pellet obtained by blending 50 percent by weight of spherical glass powder into PP.

FIG. 3 is an electron micrograph showing a ×50 enlarged view of a cut section, cut vertically from the side, of a pellet obtained by blending 50 percent by weight of spherical glass powder into PP.

From the micrograph of the cut section of the pellet in FIG. 3, the pellet contains individual spherical glass powder particles that are blended in such a way as to remain independently dispersed in PP without agglutinating together.

This clearly indicates that the atomization method covers the surface of aforementioned glass beads entirely with a silane compound so that when the aforementioned pellets are formed through kneading and extrusion of the resin in/from the extrusion machine, spherical glass powder particles are independently dispersed in the resin without agglutinating together.

Next, a circle was drawn around the mid point of the micrograph in FIG. 3 passing through the top and bottom edges, and this circle was equally divided into 16 parts and the number of spherical glass beads blended in each of these 16 sections was visually counted. The counting results are shown in Table 1.

Note that when the number of spherical glass beads was calculated, any spherical glass bead present on a line dividing any two of the 16 sections was counted as one-half and added to both sections.

TABLE 1

| Section | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Number of glass particles | 140 | 141 | 139 | 140 | 139 | 141 | 140 | 139 | 140 | 140 | 141 | 140 | 140 | 139 | 140 | 141 |

From the measured results in Table 1, the number of spherical glass beads was in a range of 140±1 in every section, indicating that spherical glass beads were distributed uniformly in the pellets.

Based on the above, it is found that the glass-containing molding pellets conforming to the present invention, produced by kneading glass powder and thermoplastic resin pellets in the extrusion machine and then extruding the mixture, are constituted by solid, spherical glass powder particles of 10 to 40 μm in average particle size and covered entirely with a silane compound, being contained in the thermoplastic resin independently and in a uniformly dispersed manner at a glass blending ratio in a range of 40 to 70 percent by weight.

Figure 4:
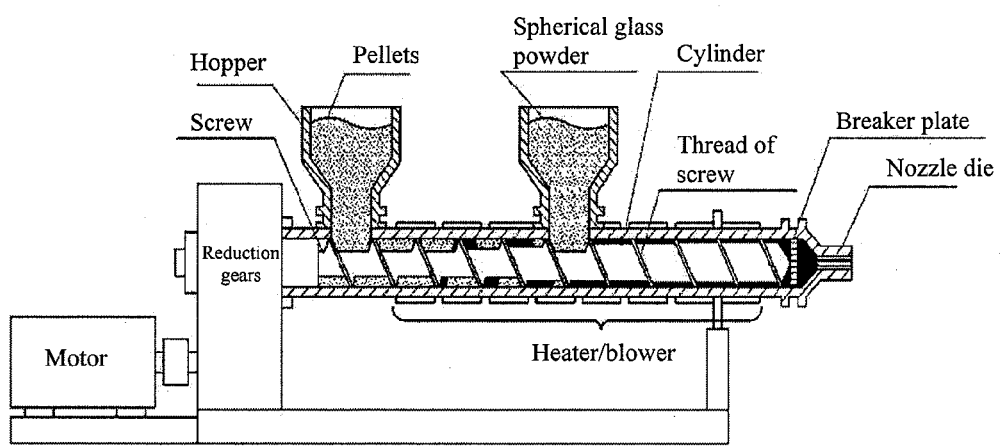
[FIG. 4] A longitudinal section view of an example of extrusion machine used under a pellet manufacturing method where PP glass-containing molding pellets are formed.

FIG. 4 is a longitudinal section view of an example of an extrusion machine used under a manufacturing method where glass-containing thermoplastic resin molding pellets are formed and a composition made thereof is manufactured. Using this extrusion machine, glass-containing molding pellets are obtained by kneading 40 to 70 percent by weight of spherical glass beads and thermoplastic resin and extruding the mixture.

A step where 40 to 70 percent by weight of spherical glass beads and thermoplastic resin are kneaded and the mixture is extruded to obtain glass-containing molding pellets is explained based on the extrusion machine in FIG. 4.

The aforementioned extrusion machine is equipped with two hoppers that are used to introduce the materials to be fed, or namely pellets and spherical glass beads. The hoppers of the extrusion machine shown in FIG. 4 are called a first hopper and a second hopper from the left, and thermoplastic resin pellets are introduced to the first hopper, while spherical glass beads are introduced to the second hopper provided near the center of the extrusion machine. The layout position of the second hopper is such that the pellets supplied into a screw barrel from the first hopper are melted as they are transported on a screw while being kneaded.

Since the extrusion machine in FIG. 4 is the same as any conventional extrusion machine except for the hopper structures, the structure of the extrusion machine in FIG. 4 is not explained in details.

(Glass-containing PE Molding Pellets)

Four types of glass-containing molding pellets were created by using PE (HD-PE) as the thermoplastic resin and adjusting the blending ratio by weight of spherical E glass beads silanized by the atomization method and PE to 40:60, 50:50, 60:40 and 70:30, respectively.

A measured weight of HD-PE (high-density polyethylene), or HI-ZEX 5100B (brand name; manufactured by Prime Polymer), was introduced from the first hopper of the aforementioned extrusion machine so that its content would become 60 percent by weight, and melted at 230° C., after which a measured amount of spherical E glass powder in the aforementioned example was introduced from the second hopper so that its content would become 40 percent by weight, this time the glass powder having been preheated to the same level as the melting temperature of 230° C. or thereabouts, and then the mixture was kneaded at 230° C. at a screw speed of 200 revolutions per minute and extruded into a bar of 3 mm in diameter, followed by water cooling and cutting of the bar to a length of 4 mm, to obtain molding pellets of Level 1 under Example 1. The preheating temperature should most preferably be the same as the melting temperature of 230° C. (or thereabouts, in a range of 230° C.±10%).

In the same manner, molding pellets of Level 2 constituted by 50 percent by weight of HI-ZEX 5100B and 50 percent by weight of spherical E glass powder, molding pellets of Level 3 constituted by 60 percent by weight of HI-ZEX 5100B and 40 percent by weight of spherical E glass powder, and molding pellets of Level 4 constituted by 30 percent by weight of HI-ZEX 5100B and 70 percent by weight of spherical E glass powder, were obtained.

(Glass-containing PP Molding Pellets)

Four types of glass-containing molding pellets were created by using PP as the thermoplastic resin and adjusting the blending ratio by weight of spherical E glass beads silanized by the atomization method and PP to 40:60, 50:50, 60:40 and 70:30, respectively.

A measured weight of PP, or Novatec PPMA3 (brand name; manufactured by Japan Polypropylene), was introduced from the first hopper of the aforementioned extrusion machine so that its content would become 60 percent by weight, and melted at 220° C., after which a measured amount of spherical E glass powder in the aforementioned example was introduced from the second hopper so that its content would become 40 percent by weight, this time the glass powder having been preheated to the same level as the melting temperature of 220° C. or thereabouts, and then the mixture was kneaded at 220° C. at a screw speed of 200 revolutions per minute and extruded into a bar of 3 mm in diameter, followed by water cooling and cutting of the bar to a length of 4 mm, to obtain molding pellets with a glass blending ratio of 40 percent by weight. The preheating temperature should most preferably be the same as the melting temperature of 220° C. (or thereabouts, in a range of 220° C.±10%).

In the same manner, molding pellets with a blending ratio of 50 percent by weight of Novatec PPMA3 and 50 percent by weight of spherical E glass beads, molding pellets with a blending ratio of 40 percent by weight of Novatec PPMA3 and 60 percent by weight of glass, and molding pellets with a blending ratio of 30 percent by weight of Novatec PPMA3 and 70 percent by weight of glass, were obtained.

(Glass-containing PET Molding Pellets)

Four types of glass-containing molding pellets were created by using PET as the thermoplastic resin and adjusting the blending ratio by weight of spherical E glass beads silanized by the atomization method and PET to 40:60, 50:50, 60:40 and 70:30, respectively.

A measured weight of PET, or Vylon FN 305 (brand name; manufactured by Toyobo), was introduced from the first hopper of the aforementioned extrusion machine so that its content would become 60 percent by weight, and melted at 250° C., after which a measured amount of spherical E glass powder in the aforementioned example was introduced from the second hopper so that its content would become 40 percent by weight, this time the glass powder having been preheated to the same level as the melting temperature of 250° C. or thereabouts, and then the mixture was kneaded at 250° C. at a screw speed of 200 revolutions per minute and extruded into a bar of 3 mm in diameter, followed by water cooling and cutting of the bar to a length of 4 mm, to obtain molding pellets of Level 1 under Example 3. The preheating temperature should most preferably be the same as the melting temperature of 250° C. (or thereabouts, in a range of 250° C.±10%).

In the same manner, molding pellets of Level 2 constituted by 50 percent by weight of Vylon FN 305 and 50 percent by weight of spherical E glass powder, molding pellets of Level 3 constituted by 40 percent by weight of Vylon FN 305 and 60 percent by weight of spherical E glass powder, and molding pellets of Level 4 constituted by 30 percent by weight of Vylon FN 305 and 70 percent by weight of spherical E glass powder, were obtained.

(Glass-containing Ny Molding Pellets)

Four types of glass-containing molding pellets were created by using Ny as the thermoplastic resin and adjusting the blending ratio by weight of spherical E glass beads silanized by the atomization method and Ny to 40:60, 50:50, 60:40 and 70:30, respectively.

A measured weight of Ny, or Nylon A1030 BRF (brand name; manufactured by Unitika), was introduced from the first hopper of the aforementioned extrusion machine so that its content would become 60 percent by weight, and melted at 230° C., after which a measured amount of spherical E glass powder in the aforementioned example was introduced from the second hopper so that its content would become 40 percent by weight, this time the glass powder having been preheated to the same level as the melting temperature of 230° C. or thereabouts, and then the mixture was kneaded at 230° C. at a screw speed of 200 revolutions per minute and extruded into a bar of 3 mm in diameter, followed by water cooling and cutting of the bar to a length of 4 mm, to obtain molding pellets of Level 1 under Example 9. The preheating temperature should most preferably be the same as the melting temperature of 230° C. (or thereabouts in a range of 230° C.±10%).

In the same manner, molding pellets of Level 2 constituted by 50 percent by weight of Nylon A1030 BRF and 50 percent by weight of spherical E glass powder, molding pellets of Level 3 constituted by 40 percent by weight of Nylon A1030 BRF and 60 percent by weight of spherical E glass powder, and molding pellets of Level 4 constituted by 30 percent by weight of Nylon A1030 BRF and 70 percent by weight of spherical E glass powder, were obtained.

Note that while the spherical glass beads introduced into the extrusion machine were preheated to the same level as the melting temperature or thereabouts in the aforementioned examples of PE, PP, PET and Ny molding pellets, the present invention is not at all limited to these examples and the melting temperature (heating, cooling), screw speed and other manufacturing conditions can be controlled at levels traditionally used in the forming of pellets.

Figure 5:
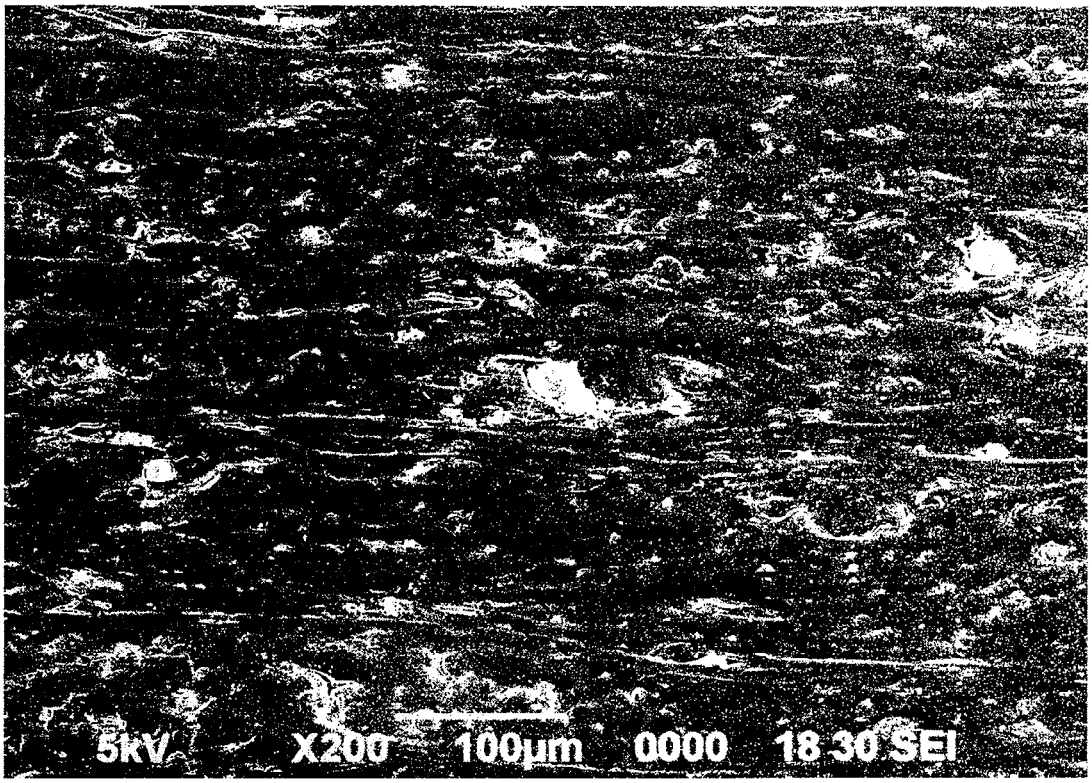
[FIG. 5] An electron micrograph showing a ×200 enlarged front view of the surface of a PP injection molded product with a glass blending ratio of 50 percent by weight.
Figure 6:
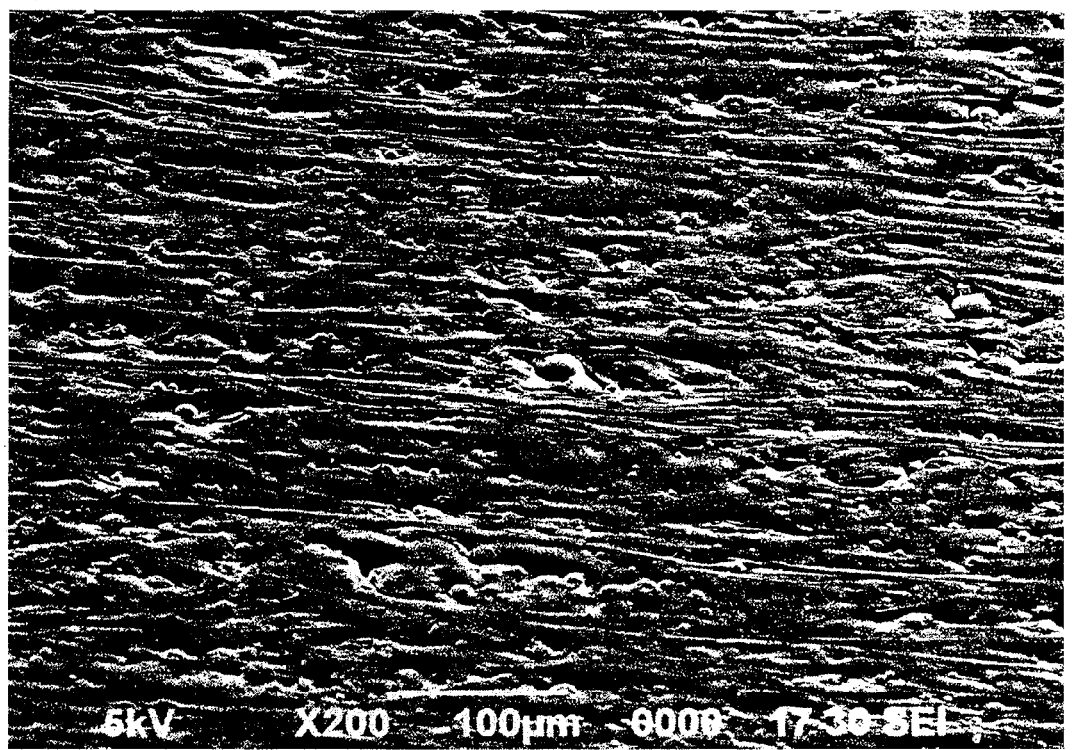
[FIG. 6] An electron micrograph showing a ×200 enlarged view from a 45-degree angle of the surface of a PP injection molded product with a glass blending ratio of 50 percent by weight.

It should be noted that the inventor of the present invention took micrographs of the surface of the aforementioned PP injection molded product with a glass blending ratio of 50 percent by weight at a 200 magnification using an electron microscope. FIG. 5 is an electron micrograph showing a ×200 enlarged front view of the surface of the PP injection molded product with a glass blending ratio of 50 percent by weight. FIG. 6 is an electron micrograph showing a ×200 enlarged view from a 45-degree angle of the surface of the PP injection molded product with a glass blending ratio of 50 percent by weight. These FIGS. 5 and 6 show the characteristic shape of an injection molded surface where a number of convex shapes are distributed. These numerous distributed convex shapes were formed as a result of contact with the die surface of the molten PP containing spherical glass beads. A skin layer forms on the surface of any injection molded product made of 100% resin, but the convex shapes in FIGS. 5 and 6 indicate that, given the 100-µ scale of these micrographs, a number of spherical glass beads are present on the surface where a skin layer is normally formed, and probably this is why no skin layer is formed on the surface of this glass-containing resin molded product.

Figure 7:
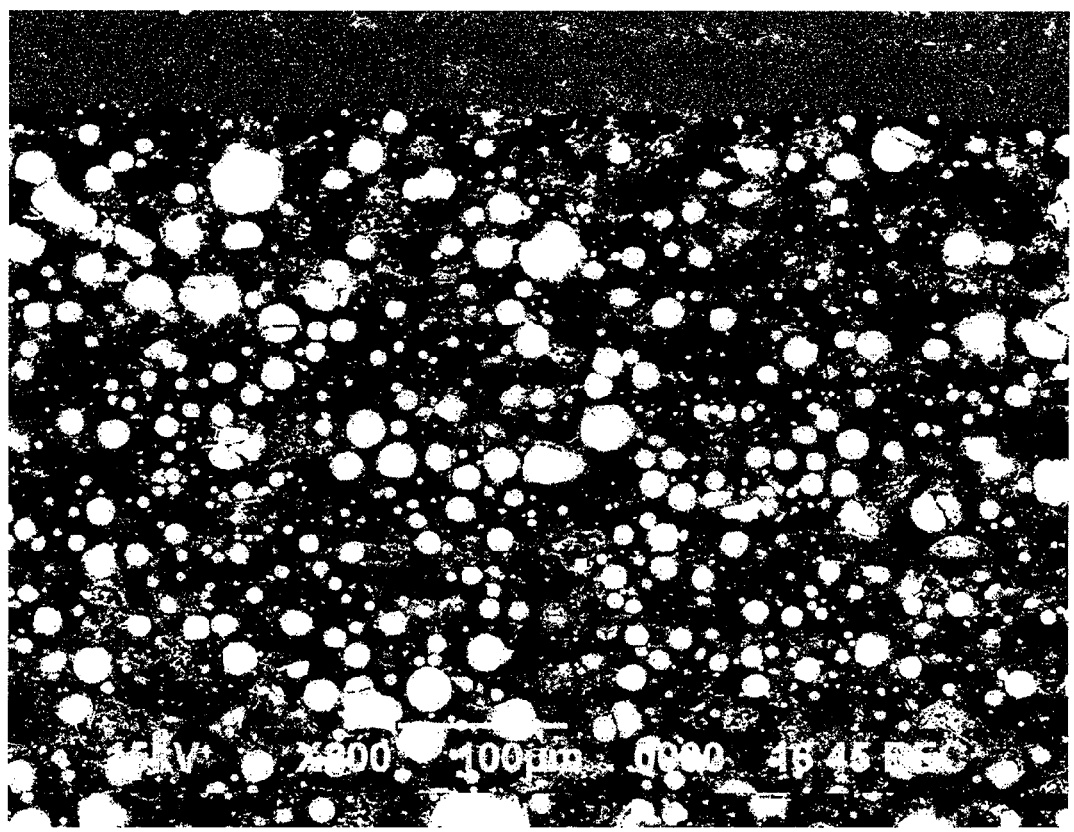
[FIG. 7] An electron micrograph showing a ×200 enlarged view of a section of a PP injection molded product with a glass blending ratio of 50 percent by weight.

Accordingly, the aforementioned PP injection molded product with a glass blending ratio of 50 percent by weight was cut and the cut surface was observed with an electron microscope, in order to examine the surface structure and see if a skin layer is formed on the surface of the injection molded product or not. FIG. 7 is an electron micrograph showing a ×200 enlarged view of the section of the PP injection molded product with a glass blending ratio of 50 percent by weight. The black area at the top of the micrograph corresponds to the acrylic resin used to facilitate the cutting of the injection molded product, while the white spherical areas are spherical glass beads and the part surrounding these beads is the injection molded product including the surface. It is clear that while a skin layer forms on the surface of any injection molded product made of 100% resin (at 0 to at least 150 µm from the surface), given the micrograph scale of 100 µm there are a number of spherical glass beads distributed on the surface where a skin layer is normally formed. Accordingly, the section micrograph of the injection molded product in FIG. 7 indicates that no skin layer will form and spherical glass beads will remain present on the surface of a glass-containing resin molded product whose glass blending ratio is 50 percent by weight.

Next, an attempt was made to directly capture the skin layers of a 100% resin molded product and other resin molded products having incremental glass blending ratios from 0, by using an electron microscope, in order to examine the mechanism of why no skin layer forms on the surface of some glass-containing resin molded products. Incidentally, capturing such a skin layer with an electron microgram has been reported difficult, while attempts have been made to measure such skin layer using an indirect method, or specifically laser Raman spectroscopy explained below, and the results suggest that measurement of skin layer is possible using laser Raman spectroscopy.

(Measurement of Skin Layer)

Results of skin layer measurement using laser Raman spectroscopy are reported in a research paper. This research paper examined whether or not laser Raman spectroscopy could be applied to analysis of the molecular orientation of injection molded products, where molecular orientation measurement was performed on polystyrene resin and an oriented layer was measured only within a thickness of 100 to 200 µm from the surface along counterflow weld lines and consequently laser Raman spectroscopy was judged effective for molecular orientation analysis ("Kagaku to Kogyo (Chemistry and Chemical Industry)," Research Paper: Structural Evaluation of Injection Molded Products by Laser Raman Spectroscopy, 81

(9), pp. 433-438 (2007)). In addition, C. M. Tobin reports the attribution of each peak in a Raman spectrum of PP and its relationship with crystallinity in J. Phys. Chem. (64, 216, 1960). Furthermore, Houska and Brummell report that Raman spectra of PP injection molded products show peaks in 998 cm$^{-1}$, 900 cm$^{-1}$ and other band fractions based on scaly crystalline orientation in Polym. Eng. Sci. (27, 12, 917-924, 1987), indicating that peaks in fractions near the surface represent a skin layer.

Accordingly, skin layer measurement was performed using laser Raman spectroscopy on injection molded products made of PP, and LDPE (low-density polyethylene resin) constituted by a crystalline polymer but whose crystallinity is low, among the aforementioned crystalline polymers PE, PP, PET and Ny.

(Skin Layer of Crystalline Polymer PP)

Using an injection molded product made of 100% PP resin whose glass blending ratio was 0 percent by weight, or specifically a resin on which a skin layer would form, and five types of PP injection molded products with glass blending ratios of 7 percent by weight, 20 percent by weight, 30 percent by weight, 40 percent by weight and 60 percent by weight as examples, an experiment was conducted in an attempt to identify the percentage of glass blending ratio at which the skin layer would disappear.

To be specific, spherical glass beads of 20 μm in average particle size (particle size measured by the scatter method, wet method; LA-920 manufactured by Horiba) were blended with PP (Novatec PPMA3 manufactured by Japan Polypropylene) at blending ratios of 0 percent by weight, 7 percent by weight, 20 percent by weight, 30 percent by weight, 40 percent by weight and 60 percent by weight, respectively, to form six types of glass-containing molding pellets, and these pellets were processed through an injection molding machine based on JIS K 7162 to create test pieces. Under the injection molding conditions of 240° C. in melting temperature, 50 kg/cm$^2$ in pressure and 60° C. in die temperature, test pieces were molded and their center was cut out using a cutting machine manufactured by EXAKT. Each cut surface was polished for 2 minutes using water-resistant abrasive paper No. 1200, and then polished for another 2 minutes using alumina powder of 0.05 μm in particle size. Next, laser Raman spectrophotometer NRS-3100 was used to measure a Raman spectrum of the cut surface by covering the surface through interior of the molded product (refer to FIG. 8).

Figure 8:
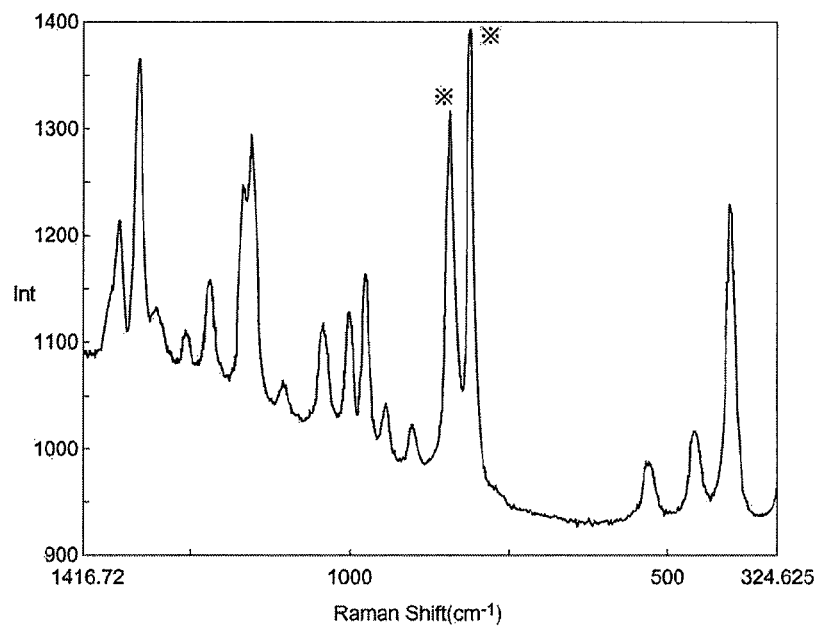
[FIG. 8] A figure showing a Raman spectrum of 100% PP resin.
Figure 9:
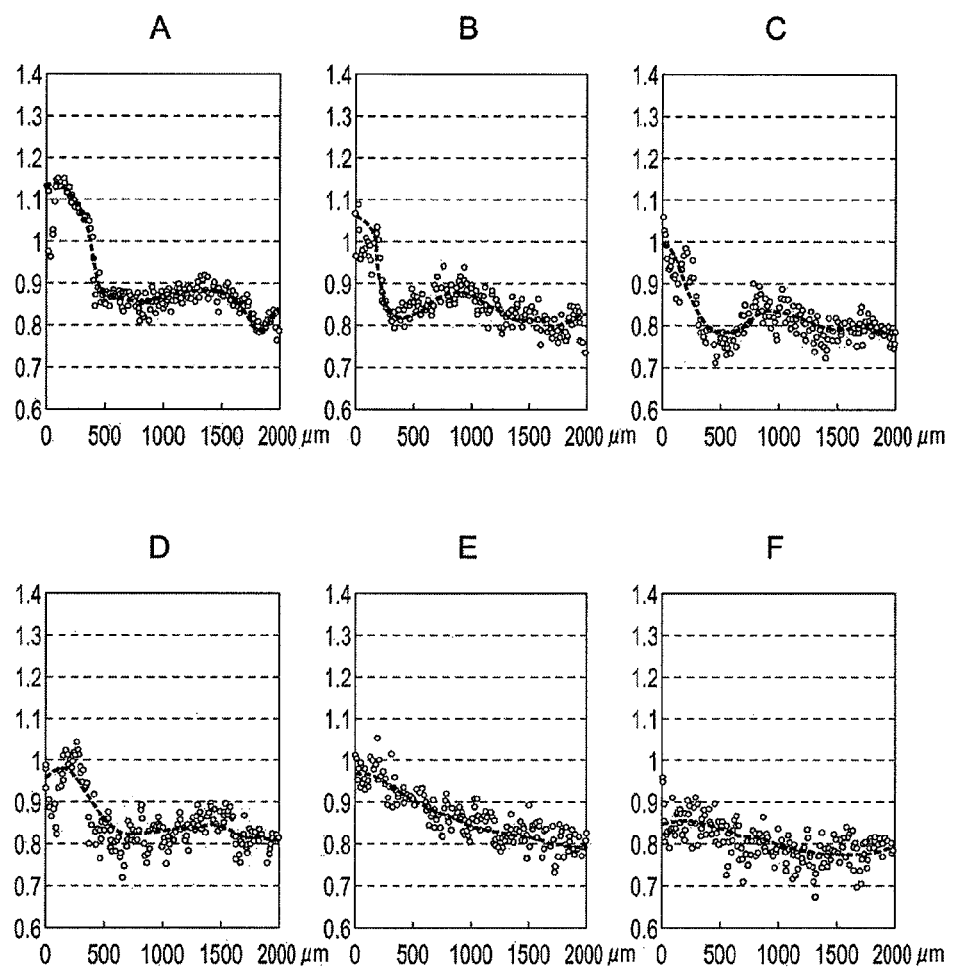
[FIG. 9] Graph showing the Raman intensity ratios of injection molded products made of 100% PP resin and resins with glass blending ratios of 7 percent by weight, 20 percent by weight, 30 percent by weight, 40 percent by weight and 60 percent by weight, measured at distances of 0 to 2000 μm from their surface.

FIG. 8 shows the Raman spectrum of 100% PP resin. The horizontal axis indicates the wavelength, while the vertical axis represents the intensity. When the Raman intensity ratio between 844-cm$^{-1}$ and 813-cm$^{-1}$ wavelengths in the Raman spectrum in FIG. 8 (844 cm$^{-1}$/813 cm$^{-1}$) is obtained, the aforementioned two wavelengths are measured at distances of 0 to 2000 μm from the surface, and Raman intensity ratios are calculated from the measured results and plotted using "○" marks, the graphs in FIG. 9 are achieved. FIG. 9 presents graphs showing the Raman intensity ratios of injection molded products made of 100% PP resin and resins having glass blending ratios of 7 percent by weight, 20 percent by weight, 30 percent by weight, 40 percent by weight and 60 percent by weight, measured at distances from 0 to 2000 μm from the surface. It should be noted that the curves in FIG. 9 are linear representations of the average Raman intensity ratios at each of the aforementioned distances corresponding to "○" marks for easier, visual understanding of the trend of Raman intensity ratios. FIG. 9A is a Raman spectrum corresponding to a glass blending ratio of 0 percent by weight in Comparative Example 1, FIG. 9B is a Raman spectrum corresponding to a glass blending ratio of 7 percent by weight in Example 1, FIG. 9C is a Raman spectrum corresponding to a glass blending ratio of 20 percent by weight in Example 2, FIG. 9D is a Raman spectrum corresponding to a glass blending ratio of 30 percent by weight in Example 3, FIG. 9E is a Raman spectrum corresponding to a glass blending ratio of 40 percent by weight in Example 4, and FIG. 9F is a Raman spectrum corresponding to a glass blending ratio of 60 percent by weight in Example 5.

In Comparative Example 1 shown in FIG. 9A, the Raman intensity ratio rises sharply in a range of 0 to 400 μm where the peak exceeds 1.1, and then falls flat in a range of 400 to 2000 μm. In Example 1 shown in FIG. 9B, the Raman intensity ratio also rises sharply in a range of 0 to 400 μm where the peak exceeds 1.0, and then falls flat in a range of 400 to 2000 μm. In Example 2 shown in FIG. 9C, the Raman intensity ratio also rises sharply in a range of 0 to 400 μm where the peak is near 1.0, and then falls flat in a range of 400 to 2000 μm. In Example 3 shown in FIG. 9D, the Raman intensity ratio also rises sharply in a range of 0 to 400 μm where the peak is a little lower than the peak at the glass blending ratio of 20 percent by weight, and then falls flat in a range of 400 to 2000 μm. In Example 4 shown in FIG. 9E, the Raman intensity ratio gradually decreases from no more than 1.0 in a range of 0 to 400 μm, and this trend is maintained in a range of 400 to 2000 μm where there is no peak. In Example 5 shown in FIG. 9F, the Raman intensity ratio is flat at no more than 0.9 throughout a range of 0 to 2000 μm where there is no peak.

In Comparative Example 1 shown in FIG. 9A and Examples 1 to 3 shown in FIGS. 9B to 9D, the Raman spectrum shape peaks in a range of 0 to 400 μm as the glass blending ratio increases, but the heights of peaks are incrementally lower. In Example 4 shown in FIG. 9E, the spectrum is gradually falling and there is no peak, and in Example 5 shown in FIG. 9F the spectrum remains flat and there is no peak. Since each peak mentioned above indicates formation of skin layer, with respect to the above Raman spectrum shapes in Comparative Example 1 shown in FIG. 9A and Examples 1 to 3 shown in FIGS. 9B to 9D, where a peak is shown in each case as the glass blending ratio increases, although the height of the peak decreases as the blending ratio increases from 0 to 40 percent by weight, it is clear that a skin layer is formed on the surface of the aforementioned glass-containing resin molded product. In Examples 4 and 5 shown in FIGS. 9E and 9F, however, there is no peak at glass blending ratios of 40 and 70 percent by weight, indicating that at these glass blending ratios no skin layer is formed on the surface of the aforementioned glass-containing resin molded product.

(Skin Layer on LDPE of Low Crystallinity)

Using as Comparative Example 2 an injection molded product made of 100% LDPE resin whose glass blending ratio was 0 percent by weight, or specifically a resin of low crystallinity on which a skin layer would form, and as Example 6 an injection molded product made of the same LDPE but containing 50 percent by weight of glass, an experiment was conducted in an attempt to examine whether or not the skin layer would disappear on the injection molded product with a glass blending ratio of 50 percent by weight.

To be specific, the same spherical glass beads used in the examples of PP were blended with LDPE (Novatec LDLJ802 manufactured by Japan Polypropylene) at blending ratios of 0 percent by weight and 50 percent by weight, respectively, to form two types of glass-containing molding pellets, and these pellets were processed through an injection molding machine based on JIS K 7162 to create test pieces. Under the injection molding conditions of 240° C. in melting temperature, 50 kg/cm$^2$ in pressure and 60° C. in die temperature, test pieces were molded and their center was cut out using a cutting machine manufactured by EXAKT. Each cut surface was polished for 2 minutes using water-resistant abrasive paper No. 1200, and then polished for another 2 minutes using alumina powder of 0.05 μm in particle size. Next, the laser Raman spectrophotometer NRS-3100 was used to measure a Raman spectrum of the cut surface by covering the surface through interior of the molded product (refer to FIG. 10).

Figure 10:
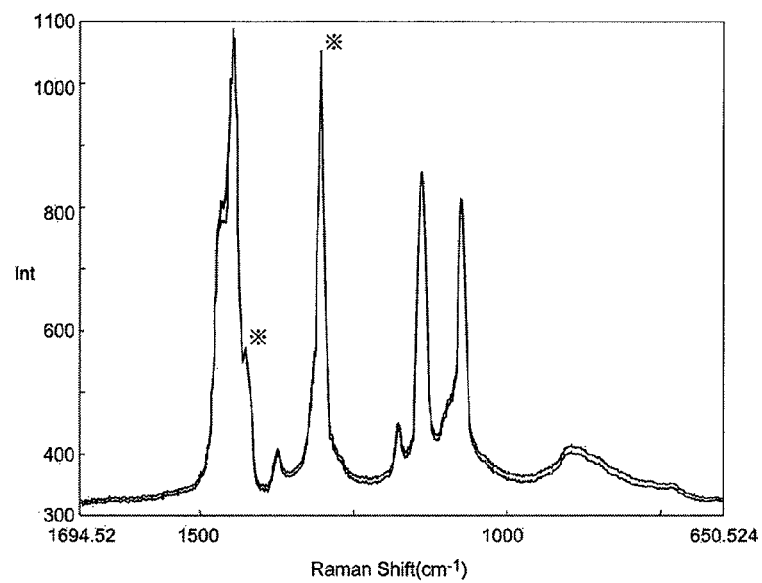
[FIG. 10] A figure showing a Raman spectrum of 100% LDPE resin.

FIG. 10 shows the Raman spectrum of 100% LDPE resin. The horizontal axis represents the wavelength, while the vertical axis represents the intensity. When the Raman intensity ratio between 1421.22-$cm^{-1}$ and 1298.22-$cm^{-1}$ wavelengths in the Raman spectrum in FIG. 10 (1421.22 $cm^{-1}$/1298.22 $cm^{-1}$) is obtained, the aforementioned two wavelengths are measured at distances of 0 to 2000 μm from the surface, and Raman intensity ratios are calculated from the measured results and plotted, the graphs in FIG. 11 are achieved.

Figure 11:
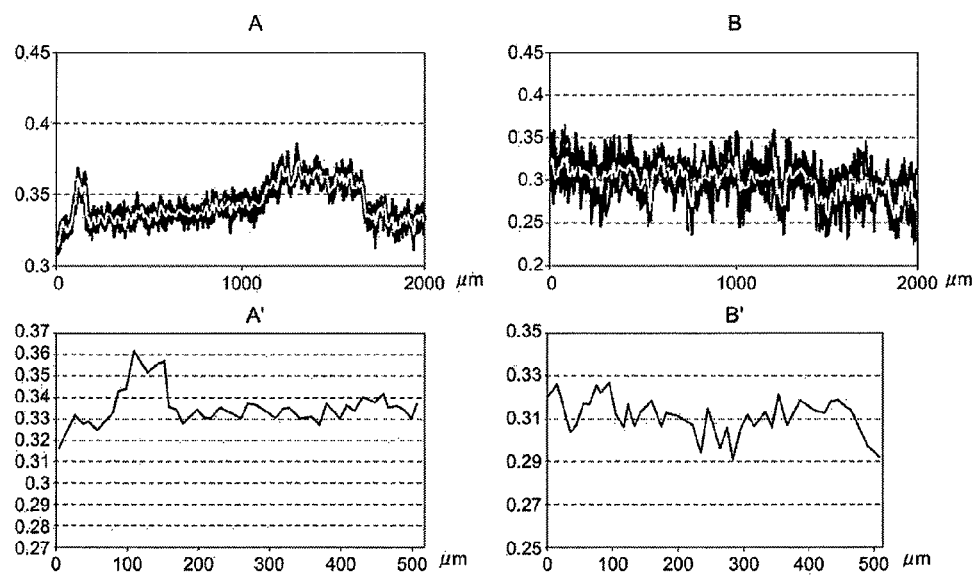
[FIG. 11] Graph showing the Raman intensity ratios of injection molded products made of 100% LDPE resin and 50% LDPE resin by weight, measured at distances of 0 to 2000 μm from their surface.

FIG. 11 presents graphs showing the Raman intensity ratios of injection molded products made of 100% LDPE resin and resin having a glass blending ratio of 50 percent by weight, measured at distances from 0 to 2000 μm from the surface. FIG. 11A is a Raman spectrum corresponding to Comparative Example 2, while FIG. 11B is a Raman spectrum corresponding to Example 6.

Note that while the graphs of Comparative Example 2 in FIG. 11A and Example 6 in FIG. 11B plot Raman intensity ratios at different distances from 0 to 2000 μm from the surface, the graphs in FIGS. 11A' and 11B' are linear expressions of average Raman intensity ratios at each of the distances from 0 to 500 μm from the surface, which are then enlarged to four times the distances for easier, visual understanding of the trend of Raman intensity ratios In the graph in FIG. 11A', the Raman intensity ratio rises sharply in a range of 100 to 150 μm where the peak exceeds 0.35, but it is less than 0.35 and flat in a range of 200 to 500 μm. In the graph in FIG. 11B', the Raman intensity ratio is less than 0.33 in a range of 0 to 500 μm where it remains flat without showing any peak.

When the above results are analyzed, it is clear that a skin layer is formed on the aforementioned glass-containing resin molded product in a range of 0 to 150 μm in Comparative Example 2, because a peak is shown in a range of 100 to 150 μm. In Example 6, however, no peak manifests in a range of 100 to 150 μm, indicating that no skin layer is formed on the surface of the aforementioned glass-containing resin molded product. The result of Comparative Example 2 where a skin layer was formed in a range of 0 to 150 μm agrees with the report in the aforementioned research paper "Chemistry and Manufacturing" that an orientated layer exists over a thickness of 100 to 200 μm from the surface.

It should be noted that the term "surface" as in "surface of 100% resin molded product" or "surface of glass-containing resin molded product" is defined not simply as the "outermost or uppermost part of something" as generally understood, but it also implies thickness and is used as such. For example, "surface" in "surface of 100% resin molded product" is a term whose meaning includes a thickness range of 0 to at least 150 μm from the exterior side or upper side of the molded product. In locations where the term "surface" is used hereafter, therefore, "surface" should be interpreted as also referring to a thickness of 0 to at least 150 μm from the surface. If the intended meaning is the aforementioned general meaning of "surface," or specifically the "outermost or uppermost part of something," then the phrase "front side" is used.

It should be noted that in the field of resin molding technology it is a matter of fact that a skin layer is formed on the surface of 100% resin molded products made of thermoplastic resins such as PE, PP, PET and Ny due to use of injection molding dies or profile extrusion molding dies; in other words, formation of skin layer has been a matter of technical common sense. However, the measured results of Raman intensity ratios under Examples 4 and 5 involving PP and Example 6 involving PE are quite shocking as they reverse this matter of technical common sense. It is clear that while a skin layer is formed on the surface of a molded product in a range of 0 to at least 150 μm from the surface when the aforementioned spherical glass beads are blended into the resin by 0 to less than 40 percent by weight, no skin layer is formed on the aforementioned resin molded product if the aforementioned spherical glass beads are blended by at least 40 percent by weight, in which case spherical glass beads remain present on the surface.

An important fact emerging from these results is that as long as spherical glass beads are blended into a resin by at least 40 percent by weight, no skin layer is formed on the resin covering the beads.

Next, the cooling time formulas used to calculate how long an injection molded product should be cooled is explained based on such factors as die surface temperature and molten resin temperature. When molten resin is injected into and thereby enters the cavity, the wall surface temperature rises due to the heat from molten resin, but the temperature gradually drops thereafter as molten resin is cooled. This cooling time is determined by the molten resin temperature, die surface temperature and heat conductivity of resin, among others, and the cooling time formulas shown below are well-known. These formulas assume that a matter present between parallel infinite plates (resin whose heat conductivity, specific heat and density are constant) is cooled by the wall surface temperature and indicate the time needed for the center temperature to reach a certain level (normally the take-out temperature) (refer to (1), "Position of Cooling Water Piping and Cooling Efficiency" on pp. 22-25 of Non-patent Literature 1):

$$\theta = -t^2/(\pi^2 \cdot \alpha) \cdot \ln[8/\pi^2 \cdot (T_x - T_m)/(T_c - T_m)]$$

$$\alpha = \lambda/(C_p \cdot \rho)$$

Here, θ indicates the cooling time (sec), t indicates the thickness (mm), Tx indicates the center temperature when the molded product is taken out (° C.) (normally the heat deformation temperature is used), Tm indicates the die surface temperature (° C.), Tc indicates the molten resin temperature (° C.), α indicates the coefficient of thermal diffusion or temperature transmission rate, λ indicates the heat conductivity of resin (cal/sec/cm/° C.), Cp indicates the specific heat of resin (cal/g/° C.), and ρ indicates the specific gravity of resin (g/$cm^3$).

It is also worth mentioning that dimensional problems, warping, deformation and other undesired outcomes of injection molded products are reported to be caused by the molding temperature in many cases (refer to (2), "Molding Thickness and Cooling Temperature" on p. 25 of Non-patent Literature 1).

It should be noted that the cooling time was measured in the molding cycle when the aforementioned glass-containing PP resin molded products with glass blending ratios of 40 and 60 percent by weight were created, and the results found that the cooling time could be shortened by as much as 20 to 30% or so. Given the above cooling time formulas (θ), this is probably because the glass blending ratio of spherical glass beads affected the heat conductivity of resin (λ) and cut the cooling time. Accordingly, the following experiment was conducted to examine whether or not the number one factor of non-formation of skin layer on the aforementioned glass resin molded resides in the aforementioned glass blending ratio on the heat conductivity of resin.
(Experiment of Heat Conductivity)
(Comparative Example)

In Comparative Example 20, resin molded products made of the aforementioned four types of resins with a glass blending ratio of 0 percent by weight (PE (Comparative Example 21), PP (Comparative Example 22), PET (Comparative Example 23) and Ny (Comparative Example 24)), or specifically 100% resins ("injection molded product with a glass blending ratio of 0 percent by weight" is hereinafter referred to as "100% injection molded product") were used.

It should be noted that the measured results of heat conductivity relating to the above four different comparative examples are shown under "0" in the column for glass blending ratio in Table 2 below, because a 100% resin molded product is the same as an injection molded product with a glass blending ratio of 0 percent by weight.
(Example)

Example 20 covers four types of resins, or specifically PE (Example 21), PP (Example 22), PET (Example 23) and Ny (Example 24). In Examples 20, samples were prepared by blending spherical E glass beads silanized by the aforementioned atomization method with one of the four types of resins, at four levels of glass blending ratios of 40:60, 50:50, 60:40 and 70:30, respectively. The heat conductivity of molded products with these glass blending ratios were measured as follows.

How the heat conductivity was measured on the aforementioned samples of five levels is explained.
(Measurement of Heat Conductivity)

A test piece of 50 mm in width×100 mm in length×3 mm in thickness was injection molded to create a disk-shaped test piece of 50 mm in diameter×3 mm in thickness, and its heat conductivity (W/m·K) was measured using a heat conductivity measuring apparatus (GH1 manufactured by ULVAC-RIKO) based on ASTM E 1530.
(Example 21)

In Example 21 where PE was used as the thermoplastic resin, obtained glass-containing molding pellets were dried for 2 hours at 80° C. and then introduced to an injection molding machine, where the pellets were melted at 240° C. and injection molded into the aforementioned test piece at a die temperature of 80° C., extrusion pressure of 800 kg/cm$^2$ and cooling time of 30 seconds, to create the aforementioned disk-shaped test piece.
(Example 22)

In Example 22 where PP was used as the thermoplastic resin, obtained glass-containing molding pellets were dried for 2 hours at 80° C. and then introduced to an injection molding machine, where the pellets were melted at 240° C. and injection molded into the aforementioned test piece at a die temperature of 80° C., extrusion pressure of 1000 kg/cm$^2$ and cooling time of 30 seconds, to create the aforementioned disk-shaped test piece.
(Example 23)

In Example 23 where PET was used as the thermoplastic resin, obtained glass-containing molding pellets were dried for 4 hours at 110° C. and then introduced to an injection molding machine, where the pellets were melted at 260° C. and injection molded into the aforementioned test piece at a die temperature of 10° C., extrusion pressure of 1000 kg/cm$^2$, and cooling time of 20 seconds, to create the aforementioned disk-shaped test piece.
(Example 24)

In Example 24 where Ny was used as the thermoplastic resin, obtained glass-containing molding pellets were dried for 5 hours at 100° C. and then introduced to an injection molding machine, where the pellets were melted at 250° C. and injection molded into the aforementioned test piece at a die temperature of 80° C., extrusion pressure of 800 kg/cm$^2$ and cooling time of 30 seconds, to create the aforementioned disk-shaped test piece.

The measured results of heat conductivity in Comparative Examples 21 to 24 where the glass blending ratio was 0 percent by weight, and Examples 21 to 24 where the glass blending ratio was adjusted to 40, 50, 60 and 70 percent by weight, are shown in Table 2.

It should be noted that E glass constituting spherical glass beads may be prepared by crushing and spheroidizing E glass fibers used for integrated circuit boards. Silica glass beads that are used as spherical glass beads are employed as semiconductor inhibitors by improving the purity of silica through refinement to an iron oxide content of 0.001% and alumina content of 0.004%, for example, and silica glass beads under the present invention may have a lower refining purity containing impurities such as approx. 0.1% of iron oxide and approx. 3.9% of alumina. Accordingly, while the heat conductivity of silica glass beads as pure as quartz glass is 1.38 at 300K, silica glass beads used under the present invention can have a lower refining purity corresponding to a heat conductivity of approx. 1.5 at 300K equivalent to E glass.

TABLE 2

| | | Comparative Example | Example | | | |
|---|---|---|---|---|---|---|
| | | 0 | 40 | 50 | 60 | 70 |
| 21 | PE | 0.334 | 0.494 | 0.541 | 0.577 | 0.634 |
| 22 | PP | 0.204 | 0.302 | 0.341 | 0.370 | 0.391 |
| 23 | PET | 0.217 | 0.340 | 0.364 | 0.399 | 0.425 |
| 24 | Ny | 0.264 | 0.401 | 0.435 | 0.468 | 0.512 |

Figure 12:
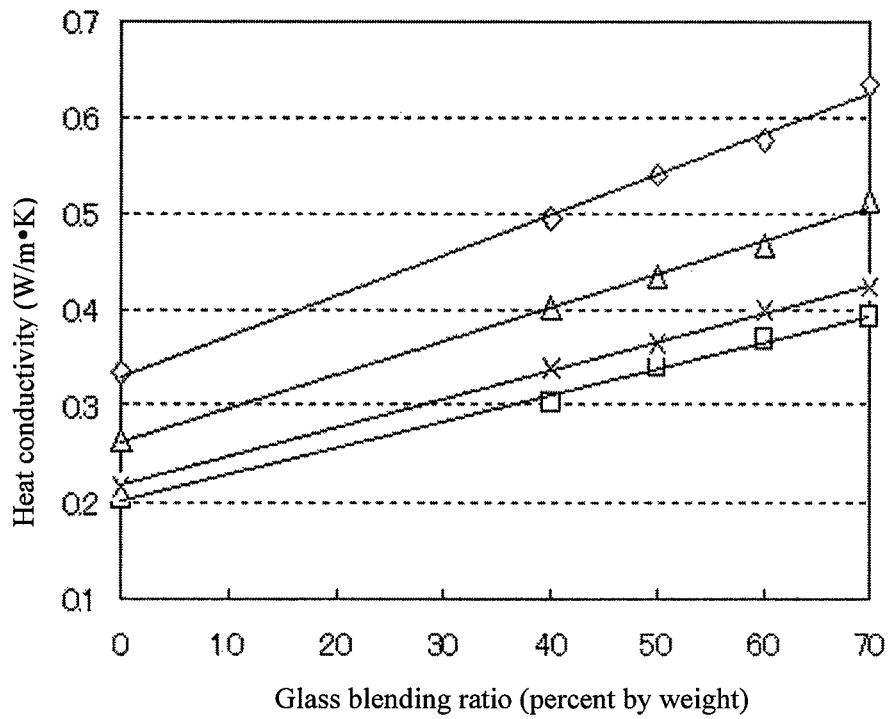
[FIG. 12] A graph drawn by a linear approximation formula based on five points obtained by plotting the glass blending ratio (percent by weight) of the glass-containing resin molded product obtained in each example along the x-axis and its heat conductivity along the y-axis.

FIG. 12 is a graph of linear approximation formula based on five points obtained by plotting the glass blending ratios (percent by weight) of four types of glass-containing resin molded products shown in Table 2 along the x-axis, and their heat conductivities along the y-axis. For the marks shown in FIG. 12, ◇ indicates PE, □ indicates Ny, △ indicates PP, and X indicates PET.

This graph in FIG. 12 shows that the glass blending ratio and head conductivity have a proportional relationship for all of the four types of glass-containing resin molded products, that the slope of the aforementioned linear approximation formula varies depending on the type of resin, and that the heat conductivity gradually increases, or improves, as the glass blending ratio increases.

Accordingly, the heat conductivity of each glass-containing resin molded product having each glass blending ratio was divided by the characteristic heat conductivity of each 100% injection molded product in order to clearly understand the rate of improvement of the heat conductivity, with increase in the glass blending rate, for the four types of 100% injection molded products.

The result of the aforementioned division indicates the rate of improvement of the characteristic heat conductivity of each 100% injection molded product mentioned above, with increase in the glass blending ratio, and is therefore defined as "heat conductivity improvement index." Accordingly, the injection molded products made of respective thermoplastic resins with a glass blending ratio of 0 percent by weight (i.e., the content of thermoplastic resin is 100 percent by weight) under Comparative Examples 21 to 24 have a heat conductivity improvement index of 1.

For instance, the specific method of calculation can be explained using PP. Since the heat conductivity of a 100% PP injection molded product is 0.204 W/m·K, the characteristic heat conductivity of an injection molded product with a glass blending ratio of 40 percent by weight is calculated as 0.302/0.204=1.48, and similarly the characteristic heat conductivity is calculated as 1.67 when the glass blending ratio is 50 percent by weight, 1.81 when the glass blending ratio is 60 percent by weight, and 1.91 when the glass blending ratio is 70 percent by weight. The calculated values are shown in Table 3.

TABLE 3

| | | Comparative Example | Example | | | |
|---|---|---|---|---|---|---|
| | | 0 | 40 | 50 | 60 | 70 |
| 21 | PE | 1.00 | 1.48 | 1.62 | 1.73 | 1.89 |
| 22 | PP | 1.00 | 1.48 | 1.67 | 1.81 | 1.91 |
| 23 | PET | 1.00 | 1.56 | 1.67 | 1.83 | 1.95 |
| 24 | Ny | 1.00 | 1.51 | 1.64 | 1.77 | 1.94 |

Figure 13:
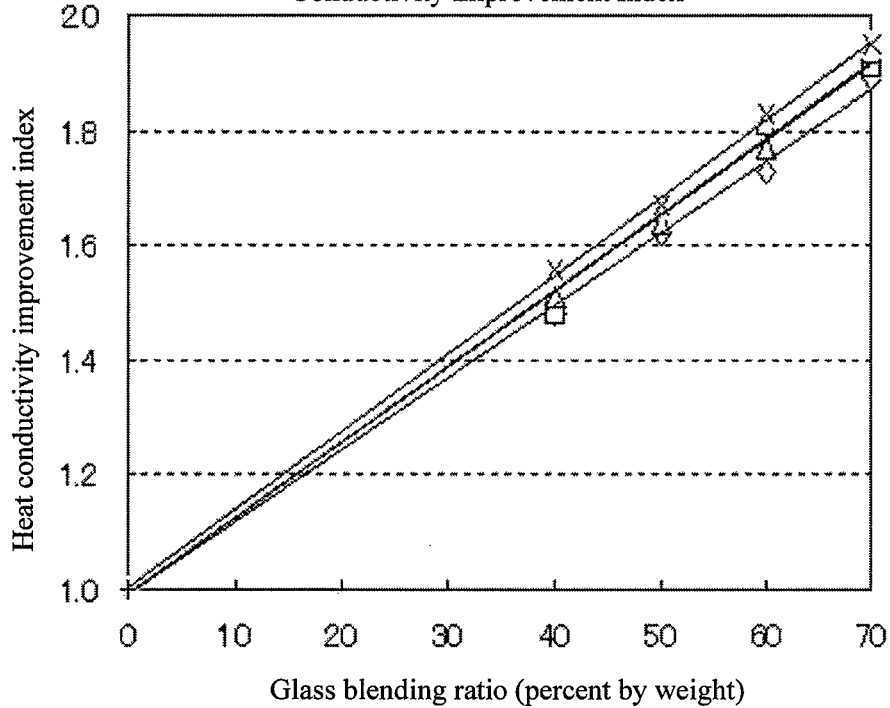
[FIG. 13] A graph showing the relationship of glass blending ratio and heat conductivity improvement index in each example.

FIG. 13 is a graph showing the relationship of glass blending ratio and heat conductivity improvement index based on the data in Table 3.

When the aforementioned heat conductivity improvement index was plotted along the y-axis relative to the x-axis representing the glass blending ratio (percent by weight), the resulting four graphs drew lines of roughly the same shape regardless of the type of thermoplastic resin. The linear approximation formulas in FIG. 12 correspond to these graphs. The linear approximation formula of PE is $y=0.0125x+0.9922$, linear approximation formula of PP is $y=0.0133x+0.9905$, linear approximation formula of PET is $y=0.0136x+1.0029$, and linear approximation formula of Ny is $y=0.0132x+0.991$, indicating that the formulas in Examples 21 to 24 exhibit the same trend of gradual increase in heat conductivity improvement index.

In other words, these linear approximation formulas are deemed to have the same slope at which the heat conductivity improves as the glass blending ratio increases, given the error of experimental data, and accordingly the heat conductivity improvement indexes at different glass blending ratios shown in Table 3 were added up and averaged. The formula obtained from the averages at five points (1.0, 1.51, 1.65, 1.79 and 1.92) was $y=0.0132x+0.9951$. Here, x represents the required glass blending ratio ($40 \leq x \leq 70$), while y represents the heat conductivity improvement index. The above formula is given as Formula (1) and indicated below:

$$y=0.0132x+0.9951 \tag{1}$$

Figure 14:
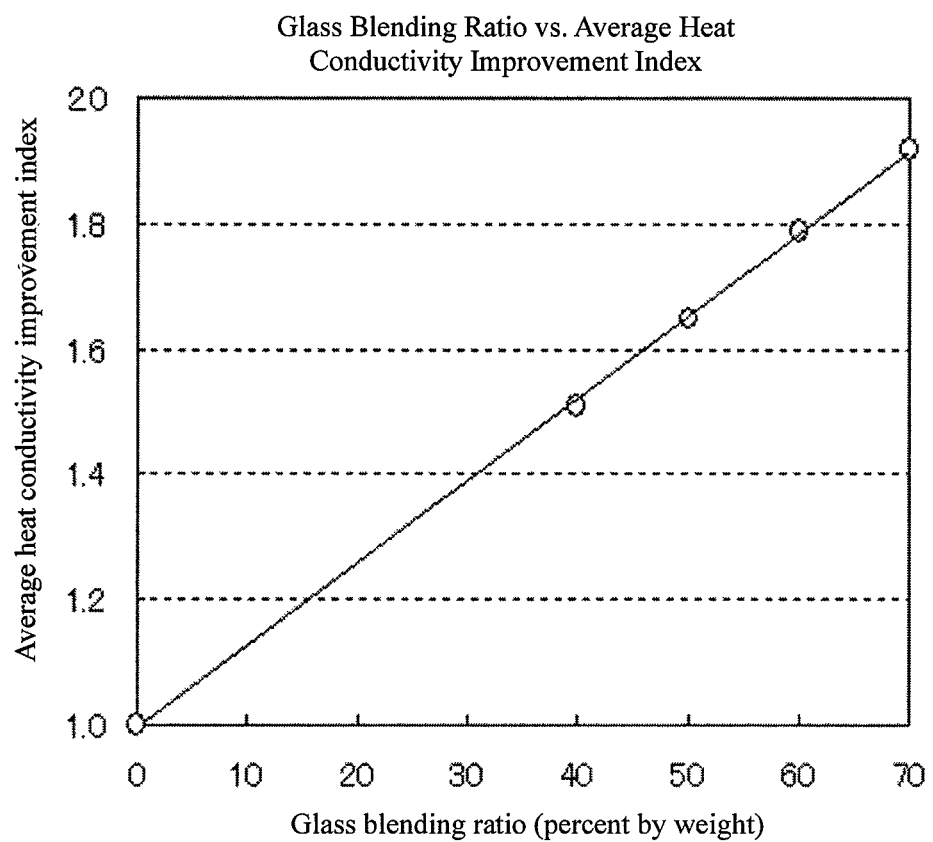
[FIG. 14] A graph showing the relationship of glass blending ratio and average heat conductivity improvement index of the glass-containing resin molded product in each example.

FIG. 14 is a graph showing the relationship of glass blending ratio and average heat conductivity improvement index of each of the glass-containing resin molded products in Examples 21 to 24, reflecting Formula (1) (hereinafter referred to as "Average Formula (1)"). This Average Formula (1) indicates that the heat conductivity improvement index of a glass-containing resin molded product increases as its glass blending ratio increases, regardless of whether the resin is PE, PP, PET or Ny.

Since the heat conductivity improvement index is 1 with the injection molded products in Comparative Examples 21 to 24, the aforementioned Average Formula (1) gives us an idea of at which rate the heat conductivity of a given glass-containing resin molded product increases, albeit gradually, as the glass blending ratio increases, compared to a 100% resin injection molded product.

Note that the heat conductivity improvement indexes calculated from the experimental data in Table 3 are different from the heat conductivity improvement indexes obtained by assigning each glass blending ratio to x in the aforementioned Average Formula (1), and accordingly the ranges of error of this experimental data at the respective glass blending ratios of 40, 50, 60 and 70 percent by weight were calculated. As a result, the range of error was +3.3 to −2.0% at a glass blending ratio of 40 percent by weight, +1.2 to −1.8% at a glass blending ratio of 50 percent by weight, +2.2 to −3.4% at a glass blending ratio of 60 percent by weight, and +1.6 to −1.6% at a glass blending ratio of 70 percent by weight. These results show that the heat conductivity improvement indexes of glass-containing resin molded products obtained by the experiment were within a range of error of +3.3% (maximum) to −3.4% (minimum).

In other words, the heat conductivity improvement index improves gradually as the glass blending ratio increases, according to the aforementioned Average Formula (1). Take note that, since the phrase "gradually decreases according to Average Formula (1)" is defined as referring to a trend including error, all values should be understood as including error when this phrase is referenced hereinafter.

It should be noted that the graph in FIG. 14 indicates that the trend of gradual increase in heat conductivity improvement index is the same among the four types of resin, which means that the aforementioned Average Formula (1) indicates that the rate at which heat is transmitted improves gradually from 1.52 times (at a glass blending ratio of 40 percent by weight) to 1.92 times (at a glass blending ratio of 70 percent by weight), compared to when resin is 100%, as the glass blending ratio increases. This shows that blending 40 percent by weight of spherical glass beads, instead of using 100% resin, would give a glass-containing resin molded product on which no skin layer is formed, and that the heat conductivity improvement index of such glass-containing resin molded product is 1.52. This is probably because the mechanism of non-formation of skin layer on the surface of glass-containing molten resin is the same among the four types of resin and the aforementioned spherical glass beads with a heat conductivity of 1.5 are present on the surface.

Accordingly, which mechanism is at work that prevents a skin layer from being formed on a glass-containing resin molded product with a heat conductivity improvement index of 1.52 or more is examined below.

The aforementioned mechanism was examined by using PP, for example, by assuming that the aforementioned spherical glass beads with a heat conductivity of 1.5 are present on the surface of the molded product, because their presence is believed to be the reason why no skin layer is formed, as mentioned above.

Figure 15:
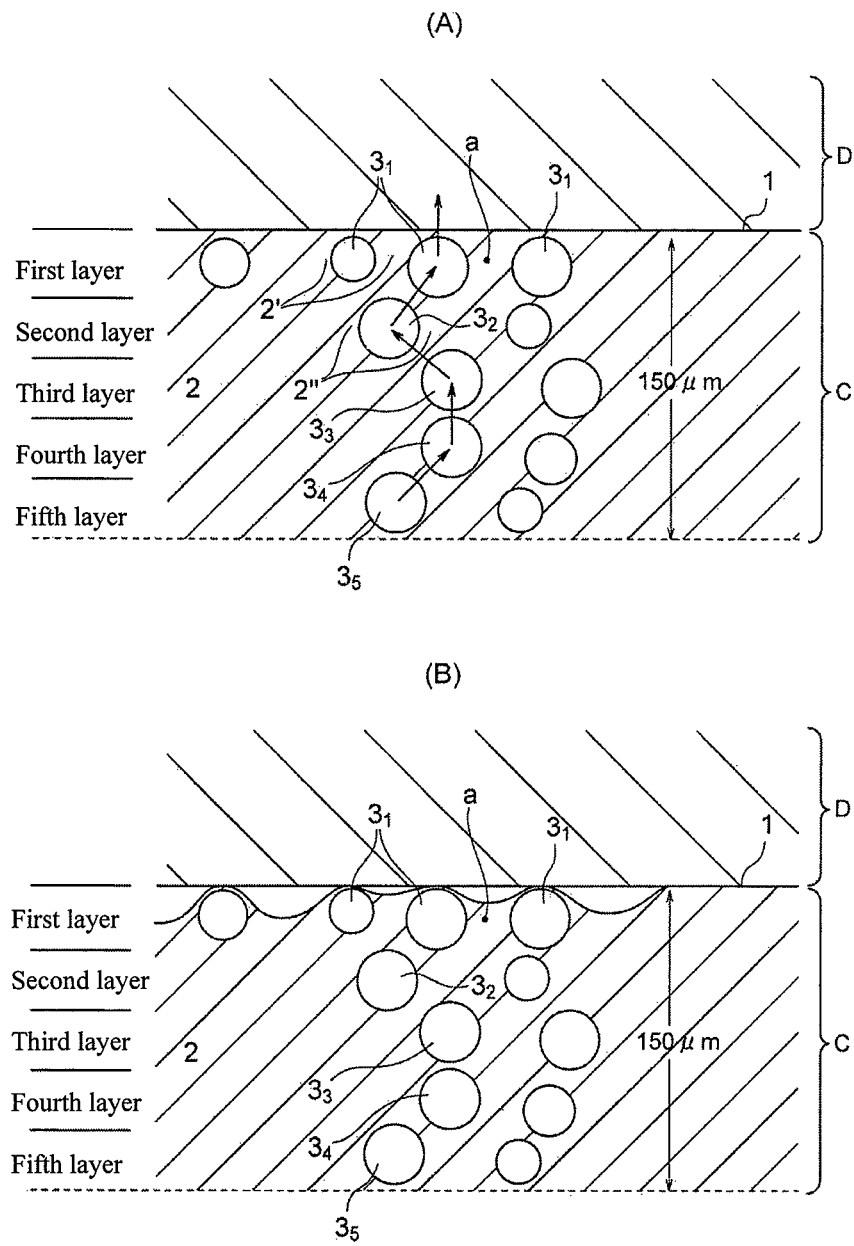
[FIG. 15] A schematic section view showing the conditions of molten PP resin with a glass blending ratio of 60 percent by weight when it was just introduced into the cavity and is contacting the die surface and after the resin has cooled.

FIG. 15 consists of schematic section views showing the condition of molten PP resin with a glass blending ratio of 60 percent by weight contacting the die surface after the resin was introduced into the cavity, and the condition after the resin has been cooled. FIG. 15A is a schematic view showing the condition of this resin contacting the die surface. The mechanism of why no skin layer is formed on the surface of the aforementioned PP resin with a glass blending ratio of 60 percent by weight, being in contact with the die surface, is examined by referring to this FIG. 15A.

Symbol C indicates the die cavity, symbol D indicates the die, and numeral 1 indicates the die surface. When molten 100% PP resin of 240° C. is introduced into the cavity (C), the heat of this 240° C. molten PP resin tries to flow to the outside through the die surface (1) whose temperature is 80° C., but as the 240° C. molten PP resin quickly contacts the die surface (1) of 80° C., it is immediately cooled and solidifies, and a skin layer is formed as a result. Heat of molten resin in the inner part of this skin layer tries to flow to the die via the skin layer, but probably because the heat conductivity of PP resin is 0.204 (W/m·K), the molten resin flowing on the inner side of the skin layer inside the cavity causes a shear layer to be formed on the inner side of the skin layer due to the shear force acting between the skin layer and fluid resin.

This is likely explained by the slow flow of heat from molten resin at the die surface (1) when molten 100% PP resin contacts the die, which probably causes a crystalline skin layer to form on the surface of the first layer, followed by formation of a shear layer on the inner side of the skin layer due to the shear force, resulting in a hardened skin layer. The skin layer thus generated corresponds to the peak in the graph shown in FIG. 9A.

Next, the reason why no skin layer is formed on PP resin (2) with a glass blending ratio of 60 percent by weight is examined by assuming that the distributed spherical glass beads present over a range of 0 to at least 150 μm from the surface of the molded product are constituted by five layers, in order to facilitate the examination. These spherical glass beads are assumed to be constituted by five layers because, as explained earlier, spherical glass beads of 10 to 40 μm in average particle size are distributed in PP resin in an independently and uniformly dispersed manner, which means that if the average particle size is assumed to be 30 μm, the entire spherical glass bead area can be viewed as being constituted by five layers. For this reason, the distance of 0 to approx. 30 μm from the surface is defined as the first layer, distance from approx. 30 to 60 μm as the second layer, distance from approx. 60 to 90 μm as the third layer, distance from approx. 90 to 120 μm as the fourth layer, and distance from approx. 120 to 150 μm as the fifth layer.

When molten PP resin (2) of 240° C. having a glass blending ratio of 60 percent by weight is introduced into the cavity (C), spherical glass beads (3$_1$) of 1.5 in heat conductivity that are present on the surface of the aforementioned first layer spanning approx. 30 μm come in contact with the die surface (1) of the die (D) via molten resin of several μm thick, and therefore heat of these 240° C. spherical glass beads (3$_1$) quickly flows toward the die whose temperature is 80° C. At the same time, since the spherical shape of glass beads (3$_1$) means that their surface area is the largest, heat of the surrounding resin (2') contacting these glass beads (3$_1$) and thereby heated to 240° C. also flows quickly toward the 80° C. die (D) via the glass beads. For example, heat at point "a" heated to 240° C., as shown in FIG. 15A, probably flows to the resin on the left side and then escapes to the die via the glass beads (3$_1$), without flowing to the resin above point "a." While the heat conductivity of 100% PP resin is 0.204, that of the spherical glass beads (3$_1$) is 1.5, or 7.4 times higher, and therefore heat of the aforementioned surrounding resin (2') escapes to the die (D) via the spherical glass beads (3$_1$).

Next, heat of the 240° C. spherical glass beads (3$_2$) constituting the second layer flows toward the spherical glass beads (3$_1$) and then toward the die via the aforementioned surrounding resin (2') the moment the heat from this resin (2') escapes to the spherical glass beads (3$_1$), and heat of the surrounding resin (2″) contacting these glass beads (3$_1$) and thereby heated to 240° C. also flows toward the spherical glass beads (3$_1$) and then toward the die via the aforementioned glass beads (3$_2$). Similarly, heat of the 240° C. spherical glass beads constituting the third layer, fourth layer and fifth layer respectively flow toward the die via the spherical glass beads constituting the preceding layer.

This is probably explained by the fact that when the molten PP resin with a glass blending ratio of 60 percent by weight contacts the die via molten resin of several μm in thickness, heat of the first layer quickly flows toward the die because the heat conductivity of spherical glass beads is 7.4 times higher than that of molten 100% PP resin, which explains why no skin layer is formed on the surface of the first layer and because no skin layer is formed, no shear layer is formed, either. Subsequently, heat quickly escapes from the spherical glass beads (3$_2$) constituting the second layer to spherical glass beads (3$_1$) constituting the first layer, from the spherical glass beads (3$_3$) constituting the third layer to spherical glass beads (3$_2$) constituting the second layer, and to the spherical glass beads (3$_1$) constituting the first layer. The flow of heat to/from the fourth and fifth layers are also the same and therefore not explained.

As explained above, heat of 240° C. in the first layer flows toward the die via spherical glass beads (3$_1$) of 1.5 in heat conductivity, after which heat of 240° C. in the second layer flows toward the die via spherical glass beads (3$_2$), and then heat of 240° C. in the third, fourth and fifth layers flows toward the die in the same manner via spherical glass beads (3$_3$), spherical glass beads (3$_4$) and spherical glass beads (3$_5$), respectively, and this way heat of 240° C. in each layer quickly escapes to the die through the flows indicated by arrows in FIG. 15A. It is considered that the aforementioned mechanism of heat conduction via spherical glass beads prevents skin layer from being formed on the molten PP resin with a glass blending ratio of 60 percent by weight.

To summarize the foregoing, the mechanism of why no skin layer is formed when molten PP resin with a glass blending ratio of 40 to 70 percent by weight contacts the die surface was revealed as the quick transmission of 240° C. heat by a number of spherical glass beads present over a range of 0 to at least 150 μm from the surface of the molded product, which in turn is explained by blending of spherical glass beads made of E glass whose heat conductivity is 1.50, into PP resin at a ratio of 40 percent by weight or more.

FIG. 15B is a schematic section view showing the condition after cooling, created by examining the front side structures illustrated in FIGS. 5 and 6 and graphs of Raman intensity ratios given by FIGS. 9 and 11. As explained above, the front side structures in FIGS. 5 and 6 indicate a characteristic shape on the front side of an injection molded product, where a number of convex shapes are distributed. These convex shapes are formed in a large number according to the thickness or thinness of resin covering the spherical glass beads as measured from the die surface to the position where spherical glass beads are present, as well as far or near distance of the horizontally oriented spherical glass beads present beneath this resin, where these four conditions are likely interacting with one another to form the aforementioned convex shapes in a probabilistic manner. For example, if spherical glass beads are thinly covered with resin and far away from one another, convex shapes are likely formed at a high probability. If spherical glass beads are thinly covered and close to one another, on the other hand, convex shapes are likely formed adjacent to one another at a high probability.

Molten resin shrinks when cooled. For example, when spherical glass beads are thinly covered with resin and far away from one another, as illustrated by the spherical glass bead on the far left in FIG. 15(B), there is less resin between the die surface and spherical glass beads and more resin is present between spherical glass beads, and therefore the resin between spherical glass beads shrinks and convex shapes are formed in a manner covering spherical glass beads. When spherical glass beads are thinly covered and close to one another, as illustrated by the three spherical glass beads at the center in FIG. 15(B), on the other hand, there is less resin between the die surface and spherical glass beads and the amount of resin between spherical glass beads is also small, and consequently the resin between spherical glass beads shrinks less than in the aforementioned example and thus convex shapes are formed adjacent to each other in a manner covering spherical glass beads.

In any case, the front side structure of a glass-containing resin molded product is such that a skin layer is formed in a range of 0 to 150 μm from the surface when the molded product is made of 100% resin, and if it is assumed that the many spherical glass beads present in this range are formed according to the four conditions of thickness or thinness of resin covering these spherical glass beads as well as farness or closeness of the horizontally oriented spherical glass beads underneath, then many convex shapes are formed in a distributed manner on the surface of a glass-containing resin molded product if its spherical glass beads are thinly covered with resin. This assumption explains the mechanism of why convex shapes as shown in the electron micrographs in FIGS. 5 and 6 are formed.

The aforementioned mechanism of why no skin layer is formed on the surface of PP resin with a glass blending ratio of 60 percent by weight was examined based on the heat conductivities of PP resin and spherical glass beads. Here, non-formation of skin layer is likely due to the presence of spherical glass beads on the surface of the molded product, and therefore in the examination these glass beads were assumed to be present on the surface. To confirm the correctness of this assumption that the aforementioned spherical glass beads are present on the surface of the molded product, tests were conducted where, as comparative examples, silver zeolite was blended with 100% Ny resin pellets, while antimony trioxide was blended with 100% PP resin pellets, and then the two resins were injection molded to produce injection molded products and, as examples, silver zeolite was blended with glass-containing Ny molding pellets, while antimony trioxide was blended with glass-containing PP molding pellets, and then the two resins were injection molded to product injection molded products, and each of these injection molded products was tested for antibacterial property and flame resistance.

The reason why testing on antibacterial property and flame resistance was conducted is as follows. For example, it is well known that while plastic injection molded products blended with an antibacterial agent are expected to demonstrate antibacterial property due to the antibacterial agent, in reality a resin-only skin layer is formed on the surface contacting the die during injection molding and this skin layer prevents silver ions of antibacterial agent from bleeding out to the surface, thereby keeping antibacterial property from being demonstrated fully. Accordingly, although an antibacterial agent, such as silver zeolite, is blended by a range of 1.0 to 3.0 percent by weight in conventional resin molded products, if the aforementioned assumption is correct, then antibacterial property can be tested under a comparative example using an injection molded product made of 100% resin blended with 1.0 percent by weight of silver zeolite, as well as an example using an injection molded product containing spherical glass beads and also blended with 0.10 percent by weight of silver zeolite, so that if the injection molded product containing spherical glass beads and also blended with 0.10 percent by weight of silver zeolite demonstrates sufficient antibacterial property, it proves the presence of silver zeolite on the surface of the molded product. If this injection molded product also demonstrates sufficient flame resistance, it also proves the presence of antimony trioxide on the surface of the molded product.

(Comparative Example of Antibacterial Agent)

Under Comparative Example 30, a total of five types of samples were prepared, where three types included a sample prepared without blending silver zeolite with 100% Ny resin as well as samples prepared by blending solid glass beads with Ny resin at a ratio of 40:60 and 50:50 without blending silver zeolite, while the remaining two types included samples prepared by blending AJ10N silver zeolite (Ag is contained by 0.3 percent by weight) (manufactured by Sinanen Zeomic) with Ny at ratios of 0.5 percent by weight and 1.0 percent by weight with respect to the weight of Ny. For your information, the particle size of the aforementioned silver zeolite was 3 to 6 μm.

(Example of Antibacterial Agent)

Under Example 30, a total of four types of samples were prepared by blending an antibacterial agent with glass-containing Ny molding pellets, where two types included samples prepared by blending solid glass beads into the aforementioned Ny resin at ratios of 40:60 and 50:50, while the remaining two types included samples prepared by blending the aforementioned silver zeolite into glass-containing Ny molding pellets at ratios of 0.05 percent by weight and 0.1 percent by weight with respect to the weight of Ny.

Table 4 shows the blending ratios of solid glass beads, Ny and antibacterial agent under Example 30 and Comparative Example 30 mentioned above.

TABLE 4

|  | Example 30 | | Comparative Example 30 | | |
| --- | --- | --- | --- | --- | --- |
| Spherical glass powder | 40 | 50 | 40 | 50 | 0 |
| Ny | 60 | 50 | 60 | 50 | 100 |
| Silver zeolite (% by weight relative to Ny) | 0.05, 0.1 | 0.05, 0.1 | 0.0 | 0.0 | 0.0, 0.5, 1.0 |

(Injection Molded Products) 100% resin pellets or pellets with a glass blending ratio of 40 or 50 percent by weight were introduced from the hopper of the injection molding machine, along with a filler (except for the samples with glass blending ratios of 40 and 50 percent by weight under the Comparative Example), and a sheet of 8×6 cm in size and 1.5 mm in thickness was formed under the conditions of 230° C. being the temperature of the pellet introduction part of the aforementioned injection molding machine, 240° C. being the screw center temperature, 245° C. being the temperature of the extrusion part, and 50 kg/m² of pressure.

(Antibacterial Property Test)

The antibacterial property test was conducted based on JIS Z 2801. For the bacterial strains, staphylococcus aureus (NBRC 12732) and colon bacillus (NBRC 3301) were planted by $2.5 \times 1.0^5$ counts/ml and cultured at 35° C. for 24 hours, after which the culture medium was washed and the viable cell count was measured.

Table 5 shows the results of the antibacterial test involving Example 30 and Comparative Example 30. The first column of Table 5 shows glass blending ratios, with the samples in Example 30 with glass blending ratios of 40 percent by weight and 50 percent by weight shown on top, followed by the samples in Comparative Example 30. The second column shows blending ratios of antibacterial agent relative to the weight of Ny, indicating the blending ratios of silver zeolite (AJ10N) in Example 30 and Comparative Example 30 above. The third and fourth columns show antibacterial test results with different bacteria, with the third column showing the results with staphylococcus aureus and fourth column, with colon bacillus.

TABLE 5

| | Silver zeolite (Ag0.3 wt %) | Staphylococcus aureus (count/ml) | Colon bacillus (count/ml) |
|---|---|---|---|
| Example 30 (blending ratio 40) | 0.05 | $6.3 * 10^2$ | $3.5 * 10^2$ |
| | 0.10 | <10 | <10 |
| Example 30 (blending ratio 50) | 0.05 | $5.6 * 10^2$ | $2.3 * 10^2$ |
| | 0.10 | <10 | <10 |
| Comparative Example 30 (blending ratio 40) | 0.00 | $1.5 * 10^5$ | $2.4 * 10^5$ |
| (blending ratio 50) | 0.00 | $1.8 * 10^5$ | $2.5 * 10^5$ |
| Comparative Example 30 (100% resin) | 0.00 | $1.9 * 10^5$ | $3.1 * 10^5$ |
| | 0.50 | $6.7 * 10^2$ | $4.3 * 10^2$ |
| (100% resin) | 1.00 | <10 | <10 |

Table 5 above shows that under Comparative Example 30, the samples made of 100% Ny and resins with glass blending ratios of 40 percent by weight and 50 percent weight, all of which were free of silver zeolite, generated staphylococcus aureus and colon bacillus, while the sample containing 0.50 percent by weight of silver zeolite also generated staphylococcus aureus and colon bacillus. The sample containing 1.00 percent by weight of silver zeolite exhibited antibacterial property. Under Example 30 involving samples of 40 percent by weight and 50 percent by weight in glass blending ratio, on the other hand, the sample containing 0.10 percent by weight of silver zeolite exhibited antibacterial property. This indicates that by blending 0.10 percent by weight of silver zeolite in glass-containing molding pellets, the antibacterial action of silver zeolite can be demonstrated efficiently. In other words, the samples under Example 30 containing 0.10 percent by weight of silver zeolite exhibited the same level of antibacterial action at one-tenth the amount of silver zeolite blended into the aforementioned sample in Comparative Example 30 containing 1.00 percent by weight of silver zeolite.

The above test results show that the samples in Example 30 (containing 0.10 percent by weight of silver zeolite) demonstrate the same level of antibacterial action as the sample in Comparative Example 30 (containing 1.00 percent by weight of silver zeolite). This proves that silver zeolite contained at one-tenth the amount in the samples of Example 30 demonstrates the same level of antibacterial action as the sample in Comparative Example 30 because, while a skin layer prevents silver ions of antibacterial agent from bleeding out to the surface of 100% resin molded product, the molded product containing 40 percent by weight of spherical glass beads does not form a skin layer because spherical glass beads are present on its surface and therefore silver ions of antibacterial agent bleed out to the surface.

It should be noted that it is well known that a silver antibacterial agent demonstrates antibacterial action due to production of silver ions by moisture, and even if the silver antibacterial agent is covered with a resin film, it still demonstrates antibacterial action as long as moisture permeates the resin and its film is thin. The relationship of the type of resin, film thickness, and moisture permeability indicating the degree of permeation of moisture, is explained below. The moisture permeability of PE is 15 to 20 $g/m^2$ per 24 hours at a thickness of 30 μm, moisture permeability of PP is 5 to 7 $g/m^2$ per 24 hours at a thickness of 20 μm, moisture permeability of Ny is 120 $g/m^2$ per 24 hours at a thickness of 15 μm, and moisture permeability of PET is 20 to 55 $g/m^2$ per 24 hours at a thickness of 12 μm. Accordingly, sufficient antibacterial action can be demonstrated even when the antibacterial agent is covered with a film of not more than 10 μm in thickness.

(Comparative Example of Flame Retardant)

Under Comparative Example 40, a total of five types of samples were prepared, where three types included a sample made of 100% PP without blending any antimony trioxide flame retardant as well as samples prepared by blending solid glass beads into PP resin at ratios of 40:60 and 50:50 and also adding antimony trioxide, while the remaining two types included samples prepared by blending antimony trioxide (manufactured by Nihon Seiko) by 0.5 percent by weight and 2.0 percent by weight relative to the weight of PP.

(Example of Flame Retardant)

Under Example 40, a total of four types of samples were prepared by blending a flame retardant into glass-containing PP molding pellets. Two types included samples prepared by blending solid glass beads into the aforementioned PP resin at ratios of 40:60 and 50:50, while the remaining two types included samples prepared by blending the aforementioned antimony trioxide into glass-containing PP molding pellets by 0.1 percent by weight and 0.4 percent by weight relative to the weight of PP.

Table 6 shows the blending ratios of solid glass beads, PP and flame retardant under Example 40 and Comparative Example 40 mentioned above.

TABLE 6

| | Example 40 | | Comparative Example 40 | | |
|---|---|---|---|---|---|
| Spherical glass powder | 40 | 50 | 40 | 50 | 0 |
| PP | 60 | 50 | 60 | 50 | 100 |
| Antimony trioxide (% by weight relative to PP) | 0.1, 0.4 | 0.1, 0.4 | 0.0 | 0.0 | 0.0, 0.5, 2.0 |

(Injection Molded Products)

100% resin pellets or pellets with a glass blending ratio of 40 or 50 percent by weight were introduced from the hopper of the injection molding machine, along with a filler (except for the samples with glass blending ratios of 40 and 50 percent by weight under the Comparative Example), and a sheet of 8×6 cm in size and 1.5 mm in thickness was formed under the conditions of 220° C. being the temperature of the pellet introduction part of the aforementioned injection molding machine, 220° C. being the screw center temperature, 235° C. being the temperature of the extrusion part, and 55 $kg/m^2$ of pressure.

(Flame Resistance Test)

The flame resistance test was conducted based on U.S. UL 94. Flame resistance levels are classified into V-0>V-1>V-2>HB, decreasing in this order, where V-0 and V-1 represents levels of self extinguishment at which spreading of fire can be prevented at the very minimum. The measured results are shown in Table 7.

Table 7 shows the flame resistance test results of Example 40 and Comparative Example 40.

The first column of Table 7 shows glass blending ratios, with the samples in Example 40 with glass blending ratios of 40 percent by weight and 50 percent by weight shown on top, followed by the samples in Comparative Example 40. The second column shows blending ratios of antibacterial agent relative to the weight of PP, indicating the blending ratios of antimony trioxide in Example 40 and Comparative Example 40 above.

TABLE 7

|  | Antimony trioxide (% by weight) | Evaluation |
|---|---|---|
| Example 40 | 0.1 | V-1 |
| (Blending ratio 40% by weight) | 0.4 | V-0 |
| Example 40 | 0.1 | V-1 |
| (Blending ratio 50% by weight) | 0.4 | V-0 |
| Comparative Example 40 | 0.0 | V-2 |
| (blending ratio 40) | 0.0 | V-2 |
| (blending ratio 50) |  |  |
| Comparative Example 40 | 0.0 | HB |
| (100% resin) | 0.5 | V-1 |
| (100% resin) | 2.0 | V-0 |

Table 7 above shows that, with respect to Comparative Example 40, the samples made of 100% PP and resins with glass blending ratios of 40 percent by weight and 50 percent by weight, all of which were free of antimony trioxide, received an evaluation of V-2, while the sample containing 0.5 percent by weight of antimony trioxide and another containing 2.0 percent by weight of antimony trioxide received evaluations of V-1 and V-0, respectively. With respect to Example 40, the samples containing 0.1 percent by weight of antimony trioxide, made of resins with glass blending ratios of 40 and 50 percent by weight, received an evaluation of V-1, while the samples containing 0.4 percent by weight of antimony trioxide, made of resins with glass blending ratios of 40 and 50 percent by weight, received an evaluation of V-0. This shows that by blending at least 0.5 percent by weight of antimony trioxide into glass-containing molding pellets, the flame retarding action of antimony trioxide can be demonstrated efficiently. To be specific, the samples as shown in Example 40 containing 0.1 percent by weight of antimony trioxide exhibit sufficient flame retarding action at one-fifth the amount of antimony trioxide blended into the aforementioned sample in Comparative Example 40 containing 0.5 percent by weight of antimony trioxide.

The above test results show that the samples in Example 40 (containing 0.1 percent by weight of antimony trioxide) demonstrate the same level of flame retarding action as the sample in Comparative Example 40 (containing 0.5 percent by weight of antimony trioxide). This proves that antimony trioxide contained at one-fifth the amount in the samples of Example 40 demonstrates the same level of flame retarding action as the sample in Comparative Example 40 because, while a skin layer covering antimony trioxide in the sample in Comparative Example 40 prevents sufficient flame retarding action from being demonstrated, this is not the case with the samples in Example 40 because antimony trioxide is present on the surface of the molded products.

The aforementioned tests of each injection molded product for antibacterial property due to antibacterial agent and flame resistance due to flame retardant produced results showing that each filler was demonstrating its action fully, which proves the presence of each filler at the surface of the molded product on which no skin layer is formed.

Experimental data is used to prove that sink marks, warping and flow marks are not generated on glass-containing resin molded products because no skin layer is formed on their surface.

(Sink Marks)

Injection molded products with a rib were prepared as comparative example and examples, including a molded product made of the aforementioned LDPE with a glass blending ratio of 0 percent by weight (Comparative Example 1), as well as molded products with a glass blending ratio of 30 percent by weight (Experimental Example 1), 40 percent by weight (Experimental Example 2) and 60 percent by weight (Experimental Example 3), and sink marks was inspected visually.

The samples in Comparative Example 1 and Experimental Example 1 are both a molded product that constitutes a flat opening/closing lid of 62 mm in length, 82 mm in width and 2.4 mm in thickness, having a rib of 1.2 mm in diameter and 3 mm in height at the center on one side. The aforementioned LDPE was used as the resin to produce pellets with glass blending ratios of 0 percent by weight, 30 percent by weight, 40 percent by weight and 50 percent by weight, and these pellets were used to create injection molded products. The molding conditions were a melting temperature of 240° C., a pressure of 50 kg/cm$^2$ and a die temperature of 60° C. The results of visual inspection of the condition of sink marks in the top face of the molded products are shown in Table 8. While the sample in Comparative Example 1 with a glass blending ratio of 0 percent by weight and another in Experimental Example 1 with a glass blending ratio of 30 percent by weight exhibited sink marks, the sample in Experimental Example 2 with a glass blending ratio of 40 percent by weight and another in Experimental Example 3 with a glass blending ratio of 50 percent by weight did not have sink marks.

These visual inspection results agree with the aforementioned results showing that, while a skin layer is formed on the surface of a resin molded product in a range of glass blending ratios of 0 to less than 40 percent by weight, no skin layer is formed in a range of glass blending ratios of 40 to 70 percent by weight. This indicates that non-formation of skin layer on the surface of glass-containing resin molded products with glass blending ratios of 40 to 70 percent by weight, due to the aforementioned spherical glass beads, is the reason why sink marks does not occur.

TABLE 8

|  | Glass blending ratio | Sink marks |
|---|---|---|
| Comparative Example 1 | 0% by weight | Occurred |
| Experimental Example 1 | 30% by weight | Occurred |
| Experimental Example 2 | 40% by weight | Did not occur |
| Experimental Example 3 | 50% by weight | Did not occur |

(Warping)

An example of an experiment where warping of flat sheets was evaluated using PP is explained. Using PP of the same quality used in the sink marks experiment, pellets with a glass blending ratio of 0 percent by weight (Comparative Example 2), 30 percent by weight (Experimental Example 4), 40 percent by weight (Experimental Example 5) and 50 percent by weight (Experimental Example 6) were created. The molding conditions were the same as those in the sink marks experiment. All molded products were shaped as a flat sheet of 50 mm in length, 100 mm in width and 3 mm in thickness.

Table 9 shows the results of measuring the amount of warping on both sides of the flat sheet, from the reference point at the center of the flat sheet, using a microscope.

While the sample in Comparative Example 2 with a glass blending ratio of 0 percent by weight and another in Experimental Example 4 with a glass blending ratio of 30 percent by weight showed warping, the sample in Experimental Example 5 with a glass blending ratio of 40 percent by weight and another in Experimental Example 6 with a glass blending ratio of 50 percent by weight did not have warping. This indicates that non-formation of skin layer, or disappearance of skin layer, at glass blending ratios of 40 to 70 percent by weight is the reason why warping does not occur.

TABLE 9

|  | Glass blending ratio | Amount of warping (mm) |
|---|---|---|
| Comparative Example 2 | 0% by weight | 1.3 |
| Experimental Example 4 | 30% by weight | 0.7 |
| Experimental Example 5 | 40% by weight | 0.0 |
| Experimental Example 6 | 50% by weight | 0.0 |

(Flow Marks)

An example of an experiment where flow marks were evaluated using PP is explained. Using PP of the same quality used in the sink marks experiment, pellets with a glass blending ratio of 0 percent by weight (Comparative Example 3) and 50 percent by weight (Experimental Example 7) were created. The injection molding conditions were the same as those in the sink marks experiment. All molded products were shaped as a soup bowl of 11 cm in outer diameter, 7 cm in height and 3 mm in thickness. Table 10 shows the evaluation results of flow marks on these soup bowls.

The sample in Comparative Example 3 with a glass blending ratio of 0 percent by weight generated flow marks of a stripe pattern on the inside of the soup bowl. On the other hand, the sample in Experimental Example 7 with a glass blending ratio of 50 percent by weight generated no flow mark at all. This indicates that non-formation of a skin layer, or disappearance of a skin layer, at glass blending ratios of 40 to 70 percent by weight is the reason why flow marks are not generated.

TABLE 10

|  | Glass blending ratio | Flow marks |
|---|---|---|
| Comparative Example 3 | 0% by weight | Occurred |
| Experimental Example 7 | 50% by weight | Did not occur |

Note that while the examples used spherical glass beads made of E glass, use of silica glass is limited to types whose heat conductivity is close to that of E glass, or 1.5. Even if silica glass is used to produce spherical glass beads, therefore, it is clear that no skin layer will form on the resin covering these silica glass beads as long as the beads are blended by at least 40 percent by weight in the resin.

The aforementioned glass-containing resin molded products can be used for various applications such as cosmetic containers, cosmetic implements, chemical containers, food containers, tableware, trays, tiles, bathtubs, kitchen/bath products, toiletry, automobile parts, electronic parts or construction materials.

What is claimed is:

1. A glass-containing resin molded product formed by molding in contact with dies a glass-containing resin produced by melting and kneading glass-containing molding pellets each constituted by a thermoplastic resin containing solid, spherical glass beads; said glass-containing resin molded product being characterized in that the solid, spherical glass beads having an average particle size of 10 to 40 μm are contained at a glass blending ratio of 40 to 70 percent by weight type of resin constituting the thermoplastic resin selected from the group consisting of polyethylene resin, polypropylene resin, polyethylene terephthalate resin and polyamide resin, and no skin layer is formed on the surface of said glass-containing resin molded product at a glass blending ratio of 40 percent by weight or more as measured by the laser Raman spectroscopy.

2. A glass-containing resin molded product according to claim 1, characterized in that sink marks, warping and flow marks are not generated on the front side of said glass-containing resin molded product.

3. A glass-containing resin molded product according to claim 2, characterized in that the spherical beads are made of E glass or silica glass.

4. A glass-containing resin molded product according to claim 3, characterized in that the dies are injection molding dies, profile extrusion molding dies or blow molding dies.

5. A glass-containing resin molded product according to claim 1, characterized in that said glass-containing resin molded product is used for cosmetic containers, cosmetic implements, chemical containers, food containers, tableware, trays, tiles, bathtubs, kitchen/bath products, toiletry, automobile parts, electronic parts or construction materials.

6. A glass-containing resin molded product formed by molding in contact with dies a glass-containing resin produced by melting and kneading glass-containing molding pellets each constituted by a thermoplastic resin containing solid, spherical glass beads; said glass-containing resin molded product being characterized in that the solid, spherical glass beads having an average particle size of 10 to 40 μm are contained at a glass blending ratio of 40 to 70 percent by weight in one type of resin constituting the thermoplastic resin selected from the group consisting of polyethylene resin, polypropylene resin, polyethylene terephthalate resin and polyamide resin, and the heat conductivity improvement index of said glass-containing resin molded product is 1.52 or more and the spherical glass beads are present on the surface of said glass-containing resin molded product.

7. A glass-containing resin molded product according to claim 6, characterized in that sink marks, warping and flow marks are not generated on the front side of said glass-containing resin molded product.

8. A glass-containing resin molded product according to claim 7, characterized in that the front side of said glass-containing resin molded product comprises a number of distributed convex shapes.

9. A glass-containing resin molded product according to claim 8, characterized in that the spherical glass beads are made of E glass or silica glass.

10. A glass-containing resin molded product according to claim 9, characterized in that the dies are injection molding dies, profile extrusion molding dies or blow molding dies.

11. A glass-containing resin molded product according to claim 10, characterized in that as the glass blending ratio increases, the heat conductivity improvement index of said glass-containing resin molded product improves gradually according to Formula (1) below:

$$y = 0.0132x + 0.9951 \quad (1)$$

(x: glass blending ratio; y: heat conductivity improvement index).

12. A glass-containing resin molded product according to claim 6, characterized in that said glass-containing resin molded product is used for cosmetic containers, cosmetic implements, chemical containers, food containers, tableware, trays, tiles, bathtubs, kitchen/bath products, toiletry, automobile parts, electronic parts or construction materials.

13. A glass-containing resin molded product formed by molding in contact with dies a glass-containing resin produced by melting and kneading glass-containing molding pellets each constituted by a thermoplastic resin containing solid, spherical glass beads; said glass-containing resin molded product being characterized in that E glass or silica glass constituting the solid, spherical glass beads having an average particle size of 10 to 40 µm is contained at a glass blending ratio of 40 to 70 percent by weight in one type of resin constituting the thermoplastic resin selected from the group consisting of polyethylene resin, polypropylene resin, polyethylene terephthalate resin and polyamide resin, and the spherical glass beads are present on the surface of said glass-containing resin molded product and the front side of said glass-containing resin molded product comprises a number of distributed convex shapes.

14. A glass-containing resin molded product according to claim 13, characterized in that sink marks, warping and flow marks are not generated on the front side of said glass-containing resin molded product.

15. A glass-containing resin molded product according to claim 14, characterized in that the dies are injection molding dies, profile extrusion molding dies or blow molding dies.

16. A glass-containing resin molded product according to claim 13, characterized in that said glass-containing resin molded product is used for cosmetic containers, cosmetic implements, chemical containers, food containers, tableware, trays, tiles, bathtubs, kitchen/bath products, toiletry, automobile parts, electronic parts or construction materials.

17. A glass-containing resin molded product according to claim 2, characterized in that said glass-containing resin molded product is used for cosmetic containers, cosmetic implements, chemical containers, food containers, tableware, trays, tiles, bathtubs, kitchen/bath products, toiletry, automobile parts, electronic parts or construction materials.

18. A glass-containing resin molded product according to claim 3, characterized in that said glass-containing resin molded product is used for cosmetic containers, cosmetic implements, chemical containers, food containers, tableware, trays, tiles, bathtubs, kitchen/bath products, toiletry, automobile parts, electronic parts or construction materials.

19. A glass-containing resin molded product according to claim 4, characterized in that said glass-containing resin molded product is used for cosmetic containers, cosmetic implements, chemical containers, food containers, tableware, trays, tiles, bathtubs, kitchen/bath products, toiletry, automobile parts, electronic parts or construction materials.

* * * * *